US007567173B2

(12) United States Patent
Takahashi et al.

(10) Patent No.: US 7,567,173 B2
(45) Date of Patent: *Jul. 28, 2009

(54) ENVIRONMENT SETUP SYSTEM, ELECTRONIC APPARATUS, RADIO COMMUNICATION TERMINAL, PROGRAM

(75) Inventors: Kazuaki Takahashi, Nagoya (JP); Makoto Matsuda, Ama-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/882,205

(22) Filed: Jul. 31, 2007

(65) Prior Publication Data
US 2007/0279216 A1 Dec. 6, 2007

Related U.S. Application Data

(60) Continuation of application No. 11/353,951, filed on Feb. 15, 2006, now Pat. No. 7,408,459, which is a division of application No. 10/464,461, filed on Jun. 19, 2003, now Pat. No. 7,068,165.

(30) Foreign Application Priority Data

Jun. 21, 2002 (JP) ............................. 2002-181685
Jun. 28, 2002 (JP) ............................. 2002-190105

(51) Int. Cl.
G08B 1/08 (2006.01)
(52) U.S. Cl. ............................. 340/539.1; 340/539.23; 340/825.49; 340/10.42; 340/10.6; 399/8; 399/81; 358/435

(58) Field of Classification Search ............. 340/539.1, 340/539.23, 825.49, 10.42, 10.6; 455/41.2, 455/41.3
See application file for complete search history.

(56) References Cited

U.S. PATENT DOCUMENTS

| 6,151,464 | A | 11/2000 | Nakamura et al. |
| 6,313,735 | B1 | 11/2001 | Higuchi |
| 6,507,716 | B2 | 1/2003 | Nomura et al. |
| 6,698,950 | B2 | 3/2004 | Nishii |
| 7,116,939 | B1 * | 10/2006 | Kandler ..................... 455/41.3 |
| 2001/0053301 | A1 | 12/2001 | Nishii |

FOREIGN PATENT DOCUMENTS

| JP | A-62-32750 | 2/1987 |
| JP | A-4-311252 | 11/1992 |
| JP | A 8-139799 | 5/1996 |

(Continued)

Primary Examiner—Davetta W Goins
(74) Attorney, Agent, or Firm—Oliff & Berridge, PLC

(57) ABSTRACT

An MPF (Multi Function Peripheral) obtains a BD address and a device name from a communication partner search response when it receives the communication partner search response from a cellular phone. When the MFP successfully obtains the BD address and the BD address is stored in a device management database in a RAM of the MFP, the MFP obtains a user name corresponding to the BD address from the device management database. The MFP obtains settings associated with the user name from an environment database in the RAM of the MFP and stores the same in an environment storage area in the RAM. A display process, etc. in the MFP are performed according to the settings stored in the environment storage area.

20 Claims, 28 Drawing Sheets

FOREIGN PATENT DOCUMENTS

| | | |
|---|---|---|
| JP | A-9-168066 | 6/1997 |
| JP | A-10-016355 | 1/1998 |
| JP | A-10-79817 | 3/1998 |
| JP | A-10-294755 | 11/1998 |
| JP | A 11-136723 | 5/1999 |
| JP | A 2000-188772 | 7/2000 |
| JP | A 2000-201234 | 7/2000 |
| JP | A-2001-45136 | 2/2001 |
| JP | A-2001-334735 | 12/2001 |
| JP | A-2002-002066 | 1/2002 |

* cited by examiner

FIG.2A

DEVICE MANAGEMENT DB

| Device name | BD address | User name |
|---|---|---|
| Device A | 00:10:20:30:**:01 | Taro |
| Device B | 00:40:50:60:**:02 | Jurgen |
| Device C | 00:70:80:90:**:03 | Michel |

FIG.2B

ENVIRONMENT MANAGEMENT DB

| User name | Hear volume | Speak volume | Font | Font size | Charset | Transmission record data | Address book data |
|---|---|---|---|---|---|---|---|
| Default | medium | medium | gothic | 12 | English | Default DB | Default book |
| Taro | medium | large | gothic | 15 | Japanese | Transmission DB_A | User 1 book |
| Jurgen | large | medium | times | 10 | German | Transmission DB_B | User 2 book |
| Michel | small | small | times | 10 | English | Transmission DB_C | User 3 book |

FIG.3A
USER PROPERTY ACQUISITION INFO DB

| User name | Nationality | Age |
|---|---|---|
| Taro | Japan | 20 |
| Jurgen | Germany | 28 |
| Michel | UK | 60 |

FIG.3B
USER PROPERTY MANAGEMENT DB

| Nationality | US | Japan | UK |
|---|---|---|---|
| Charset | English | Japanese | English |
| Font | times | gothic | times |

| Age | over 50 | other |
|---|---|---|
| Font size | 30 | 15 |

[MFP TRANSMISSION RECORD DATABASE GENERATION PROCESS]

FIG.17A

SETTING INFO MANAGEMENT DB OF CELLULAR PHONE 200a    50a

| User name | Charset | Font size | Hear volume | Speak volume | ... |
|---|---|---|---|---|---|
| David | English | 15 | 15 | 15 | |

| User name | Media size | NumberUp | Print Quality | ... |
|---|---|---|---|---|
| David | a4 | 4in1 | normal | |

| User name | Scan Type | Resolution | Image format |
|---|---|---|---|
| David | True Gray | 200x200 | jpg |

FIG.17B

SETTING INFO MANAGEMENT DB OF CELLULAR PHONE 200b    50b

| User name | Charset | Font size | Hear volume | Speak volume | ... |
|---|---|---|---|---|---|
| Jackson | English | 10 | 10 | 10 | |

| User name | Media size | NumberUp | Print Quality | ... |
|---|---|---|---|---|
| Jackson | letter | 2in1 | high | |

| User name | Scan Type | Resolution | Image format |
|---|---|---|---|
| Jackson | 24bit color | 300x300 | bmp |

SETTING DISPLAY SCREEN OF CELLULAR PHONE 200a

SETTING DISPLAY SCREEN OF CELLULAR PHONE 200b

FIG.22A

FAX SETTING DISPLAY SCREEN (AFTER COMMUNICATION WITH CELLULAR PHONE 200a)

34

```
Name          :David
setting
Hear volume   :15
Speak volume  :15
Font size     :15
```

FIG.22B

FAX SETTING DISPLAY SCREEN (AFTER COMMUNICATION WITH CELLULAR PHONE 200b)

34

```
Name          :Jackson
setting
Hear volume   :10
Speak volume  :10
Font size     :10
```

FIG.23A

PRINTER SETTING DISPLAY SCREEN (AFTER COMMUNICATION WITH
CELLULAR PHONE 200a)

```
Name         :David
setting
Media size   :a4
NumberUp     :4in1
Print Quality :normal
```

FIG.23B

PRINTER SETTING DISPLAY SCREEN (AFTER COMMUNICATION WITH
CELLULAR PHONE 200b)

```
Name         :Jackson
setting
Media size   :letter
NumberUp     :2in1
Print Quality :high
```

SCANNER SETTING DISPLAY SCREEN (AFTER COMMUNICATION WITH CELLULAR PHONE 200a)

SCANNER SETTING DISPLAY SCREEN (AFTER COMMUNICATION WITH CELLULAR PHONE 200b)

FIG.25A

TERMINAL SETTING MIB DEFINITION

| NAME | OID | TYPE | DEFINED VALUE |
|---|---|---|---|
| tmUserName | 1.3.6.1.4.1.XXXX.1 | String | |
| tmCharaSet | 1.3.6.1.4.1.XXXX.2 | Integer | 0:English<br>1:Japanese<br>2:French |
| tmfontSize | 1.3.6.1.4.1.XXXX.3 | Integer | |
| tmHearVolume | 1.3.6.1.4.1.XXXX.4 | Integer | |
| tmSpeakVolume | 1.3.6.1.4.1.XXXX.5 | Integer | |

FIG.25B

TERMINAL SETTING MIB OF CELLULAR PHONE 200a

| tmUserName | David |
|---|---|
| tmCharaSet | 0 |
| tmfontSize | 15 |
| tmHearVolume | 15 |
| tmSpeakVolume | 15 |

FIG.25C

TERMINAL SETTING MIB OF CELLULAR PHONE 200b

| tmUserName | Jackson |
|---|---|
| tmCharaSet | 0 |
| tmfontSize | 10 |
| tmHearVolume | 10 |
| tmSpeakVolume | 10 |

ENVIRONMENT SETUP SYSTEM, ELECTRONIC APPARATUS, RADIO COMMUNICATION TERMINAL, PROGRAM

This is a Continuation of application Ser. No. 11/353,951 filed Feb. 15, 2006 which is a Divisional of application Ser. No. 10/464,461 filed Jun. 19, 2003. The disclosure of the prior applications is hereby incorporated by reference herein in its entirety.

BACKGROUND OF THE INVENTION i) Technical Field of the Invention

This invention relates to an environment setup system, electronic apparatus, a radio communication terminal and a program that set up an environment of the electronic apparatus based on environment information or the like of each user.

ii) Description of the Related Art

Conventionally, there is a known shared electronic apparatus that stores environment information of each user. Such an electronic apparatus allows a user to work in an environment prepared based on the personal environment information called up by some user operation to the apparatus when the user intends to use the apparatus.

For example, if the electronic apparatus is a fax fax machine to store the same in a personal address book. The user can operate the operation panel to call up and refer to the personal address book when transmitting a copy.

However, such a manner to call up the environment information of each user is getting more and more difficult and complicated as the electronic apparatus is provided with more functions. In many cases, complicated procedures are required before each user calls up and use the personal environment information. Especially in an electronic apparatus, the procedures tend to be quite complex since miniaturization of display and input devices are severely demanded.

In a fax machine, for instance, calling-up of the environment information is usually performed by user operation which includes a combination of numeric keys and special keys. As a result, the operation is not intuitively understandable and is hard to remember.

Under the circumstances, the user has to consult manuals on how to call up the environment information and thus it takes a lot of time. Furthermore, since the manner to call up the environment information may differ from one apparatus to another, the user has to remember various manners to call up the environment information.

SUMMARY OF THE INVENTION

An object of the present invention, which has been made to solve the aforementioned problems, is to provide an electronic apparatus, environment setup system, etc. which allow each user to easily make use of personal environment information without time-consuming input procedures for calling up the environment information.

In order to attain the above object, the present invention provides an environment setup system that stores environment information of each user for an electronic apparatus in a storage unit. A radio communication terminal transmits identification information for identifying a user by radio to the electronic apparatus, and the electronic apparatus receives the identification information. The electronic apparatus obtains the environment information of the user identified by the received identification information, and sets up an environment of the electronic apparatus based on the obtained environment information.

In the above, only by the transmission of the identification information from the radio communication terminal, the environment of the electronic apparatus is switched to an environment which corresponds to the environment information of the user identified by the identification information. As a result, each user can enjoy their personal environment, without remembering how to call up the environment information.

A radio communicable distance between the radio communication terminal and the electronic apparatus is determined based on a positional relation between the user and the electronic apparatus when the user uses the electronic apparatus.

When utilizing the electronic apparatus, the user is likely to take a certain position with respect to the electronic apparatus. For example, if the electronic apparatus is a fax machine, the user firstly sets a copy on the fax machine. Then, the user, standing in front of an operation panel of the fax machine, operates the fax machine, for example, to select an address of the transmission destination in the operation panel.

In such cases, the predetermined communicable distance between the radio communication terminal and the fax machine may set to be within a radius of 2 m, for example, from the operation panel of the fax machine.

Then, the environment of the electronic apparatus is automatically switched to the environment of the user, when the user carrying the radio communication terminal intends to use the electronic apparatus.

As a result, the user can use the electronic apparatus in the personal environment without performing complicated switching operation of the environment. Therefore, even if the electronic apparatus is a shared apparatus, for example, each user can use the apparatus as if it is their personal apparatus. It is preferable that the aforementioned communicable distance is limited to a range which allows the apparatus to specify only one user.

A method for the communication between the radio communication terminal and the electronic apparatus can be selected from various communication methods. Specifically, for example, use of a radio communication method based on the Bluetooth standard shows beneficial effects. The Bluetooth standard sets a relatively short distance (of a few to a hundred meters, for example) as the predetermined communicable distance, and most electronic apparatuses are mainly for use within the range.

The radio communication terminal may be any device that is capable of transmitting the identification information. It is preferable that the communication terminal is a device which is always carried by the user, such as a cellular phone and PDA.

It is preferable that the storage unit that stores the environment information of each user for the electronic apparatus is provided in the electronic apparatus, or in an apparatus which can communicate with the electronic apparatus via a network so that the electronic apparatus can obtain the environment information via the network.

The environment information stored in the storage unit may includes, for example, information about various settings of the electronic apparatus, information regarding choice of functions of the electronic apparatus, and information about databases, etc. of the electronic apparatus.

The environment information of each user stored in the storage unit may be associated with the identification information for identifying a user. As to the information stored in the storage unit, for example, the identification information for identifying a user may be firstly associated with the identification information for identifying a group to which the user belongs, and then the identification information for identifying the group may be associated with the respective environment information. The identification information for identifying a user may be directly associated with the environment information of each user.

It is preferable that the environment information of each user stored in the storage unit is associated with user identification information that enables identification of a user. The user identification information can be any information that enables identification of a user and may include a user ID or unique name, for example, which can draw a distinction between users. If the radio communication terminal is used by a specific user, any identification information transmitted from that radio communication terminal may be regarded as the user identification information.

The storage unit stores in advance the environment information of each user. Although the stored environment information may be static, it is preferable that the stored environment information can be changed by users.

For example, it is preferable that the electronic apparatus is designed to urge the storage unit to store the environment information of each user. It is particularly preferable that, at the time when the electronic apparatus urges the storage unit to store the environment information, the storage unit stores the environment information as the environment of the specific user identified by the identification information received by a reception unit of the electronic apparatus.

In short, it is preferable that the electronic apparatus comprises an update unit that updates the environment information of each user stored in the storage unit.

It is further preferable that the electronic apparatus comprises a change unit that changes the environment set up by a setup unit of the electronic apparatus, for example.

In this case, the update unit updates the environment information of each user stored in the storage unit in such a way that the environment information corresponds to the environment after the change by the change unit.

As a result, the change of the environment by the user is reflected on the environment information stored in the storage unit. Such a constitution helps to keep the environment of the electronic apparatus easy to use for the user.

It is preferable that the electronic apparatus generates information regarding a work history of each user in the electronic apparatus as the environment information and urges the storage unit to store the generated information as the environment information of each user.

It is further preferable that the electronic apparatus is designed to store the information regarding the work history in a database provided as the storage unit of each user.

With the above constitution, the user can easily utilize the electronic apparatus using the personal information regarding the work history of the electronic apparatus. If the electronic apparatus is a fax machine, for example, the user can use information regarding a transmission record (including transmission destination address information), information regarding an output setting, etc., as the aforesaid information regarding the work history.

The above advantages can be implemented by the electronic apparatus further constituted as below, for example.

Particularly, for example, an environment information acquisition unit in the electronic apparatus is designed to obtain from the storage unit the information regarding the work history of the electronic apparatus of the specific user identified by the identification information received from the radio communication terminal. The setup unit then sets the environment of the electronic apparatus in such a way that the obtained information regarding the work history is available in the electronic apparatus.

In this manner, even if the electronic apparatus is a shared apparatus, for example, each user can use only the personal information regarding the work history of their own, while the information regarding the work history of others is not available. Accordingly, each user can use the electronic apparatus as if it is their personal apparatus.

Transmission of the identification information from the radio communication terminal to the electronic apparatus can be performed under the following constitution (procedures).

In the environment setup system, for example, the electronic apparatus may detect presence of the radio communication terminal located within a predetermined communicable distance from the electronic apparatus, and request transmission of the identification information from the detected radio communication terminal. In this case, the radio communication terminal transmits the identification information when there is the request for transmission.

With such a constitution, when the electronic apparatus detects the radio communication terminal located within the predetermined communicable distance, the electronic apparatus can obtain the identification information from the detected radio communication terminal and switch the environment of the electronic apparatus.

A detection unit that detects presence of the radio communication terminal as above in the electronic apparatus may be constituted as below.

The detection unit includes a search signal transmission unit that transmits a search signal for searching the radio communication terminal within the above predetermined communicable distance and a response signal reception unit that receives a response signal from the radio communication terminal to the search signal, and the detection unit determines presence of the radio communication terminal based on the response signal received by the response signal reception unit.

In this case, the radio communication terminal comprises a search signal reception unit that receives the search signal and a response signal transmission unit that transmits the response signal to the search signal when the search signal is received by the search signal reception unit.

The radio communication terminal may transmit the identification information when it receives the request signal from the electronic apparatus, or transmit an identification signal once it detects the search signal from the electronic apparatus.

Particularly, the radio communication terminal transmits the identification information, followed by the transmission of the search signal by the electronic apparatus for searching the radio communication terminal which can communicate with the electronic apparatus and reception of the search signal by the radio communication terminal.

As a result, when the electronic apparatus transmits the search signal (inquiry based on the Bluetooth standard, for example), the environment of the electronic apparatus is switched to an environment based on the identification information received from the radio communication terminal, for example.

If the electronic apparatus searches the radio communication terminal at appropriate time intervals, for example, it can at any time switch the environment to the environment of the user carrying the radio communication terminal located within the predetermined communicable distance from the electronic apparatus.

Also, if the electronic apparatus may be designed to transmit the search signal based on a user input of a search command, the electronic apparatus can switch the environment based on the identification signal transmitted from the radio communication terminal in response to the search signal.

As in the above, the electronic apparatus may search and detect the radio communication terminal located within the predetermined communicable distance from the electronic apparatus, or the radio communication terminal may search and detect the electronic apparatus.

It is preferable that, in the environment setup system, the radio communication terminal detects presence of the electronic apparatus located within the predetermined communicable distance from the radio communication terminal and transmits the identification information to the detected electronic apparatus, for example.

In this manner, once the radio communication terminal detects presence of the electronic apparatus, the environment of the electronic apparatus can be switched to the environment of the user carrying the radio communication terminal.

In this case, a detection unit provided in the radio communication may include a search signal transmission unit that transmits a search signal for searching the electronic apparatus located within the predetermined communicable distance from the radio communication terminal and a response signal reception unit that receives a response signal from the electronic apparatus in response to the search signal.

Accordingly, in the radio communication terminal, the detection of the electronic apparatus is confirmed by reception of the response signal by the response signal reception unit.

In the above, the electronic apparatus comprises a search signal reception unit that receives the search signal and a response signal transmission unit that transmits the response signal to the search signal when the search signal reception unit receives the search signal.

In other words, the radio communication terminal transmits the search signal for searching the electronic apparatus located within the predetermined communicable distance from the radio communication terminal, and the electronic apparatus transmits the response signal when the search signal is received. The radio communication terminal transmits the identification information when the response signal is received.

In this manner, the search for the electronic apparatus by the radio communication terminal is detected by the electronic apparatus, and, when the electronic apparatus responds, the radio communication terminal can transmit the identification information to the electronic apparatus.

On the other hand, the radio communication terminal may transmit the search signal for searching the electronic apparatus located within the predetermined communicable distance from the radio communication terminal, the electronic apparatus requests transmission of the identification information from the radio communication terminal that transmits the search signal when it receives the search signal, and the radio communication terminal transmits the identification information when there is the request for transmission.

As a result, when the electronic apparatus receives the search signal from the radio communication terminal, the electronic apparatus requests the identification information and obtain the same from the radio communication terminal to switch the environment.

A request unit of the electronic apparatus that requests transmission of the identification information can be designed to transmit a request signal by radio, for example.

It is preferable that the setup unit switches the environment to a predetermined environment when it does not receive the identification information from the reception unit any longer.

For example, it is preferable that the electronic apparatus is designed to switch the environment to the predetermined environment, when a user draws away from the electronic apparatus and the identification information from the radio communication terminal carried by the user can be no longer received.

The electronic apparatus may be designed to switch the environment to the default environment if a predetermined time has passed since the electronic apparatus did not detect the radio communication terminal which can communicate with the electronic apparatus.

Such a constitution can reduce probability that the personal environment information (such as transmission record) of the user is peeked or used by another user.

The identification information that can be transmitted from the radio communication terminal may include property information for specifying properties of the user carrying the radio communication terminal. The property information may be related to at least one of nationality, age, sex, etc. of the user.

In this case, it is preferable that the environment information acquisition unit of the electronic apparatus obtains from the storage unit the environment information corresponding to the property information received by the reception unit, and the setup unit sets up the environment of the electronic apparatus based on the obtained environment information.

Particularly, for example, it is preferable that the electronic apparatus is provided with a storage unit that stores various types of information regarding environment settings corresponding to the property information such as nationality, age, etc. which may differ from one user to another.

In this manner, it is possible to easily set up the environment of the electronic apparatus which corresponds to the property information of the specific user.

In the environment setup system, the radio communication terminal may comprise a predetermined interface, a storage unit that stores settings of the user interface, and a transmission unit that transmits user interface setting specification information for specifying the settings of the user interface stored in the storage unit to the electronic apparatus.

In this case, the electronic apparatus may comprise a predetermined user interface. The electronic apparatus may be designed in such a way that the reception unit receives the user interface setting specification information from the radio communication terminal and the setup unit sets up the user interface of the electronic apparatus based on the user interface setting specification information received by the reception unit.

With such a constitution, since the user interface (environment) of the electronic apparatus is set up based on the settings of the user interface stored in the radio communication terminal, it is not necessary for the user carrying the radio communication terminal to directly operate the electronic apparatus to set up the user interface of the electronic apparatus. The user can use the electronic apparatus with the user interface prepared based on the settings stored in the radio communication terminal.

In this case, in the radio communication terminal, the settings of the user interface stored in the storage unit may include at least one of the settings of the user interface of the radio communication terminal and settings of the user interface of the electronic apparatus which is a transmission target of the radio communication terminal.

As a result, the user can use the electronic apparatus with the same user interface as in the radio communication terminal, for example, without directly operating the electronic apparatus to set up the user interface of the electronic apparatus.

For instance, assuming that a personal device such as a cellular phone and PDA as the radio communication terminal can communicate with an electronic apparatus such as a fax machine, etc. by radio, the settings of the user interface of the fax machine, etc. can be changed according to the settings of the user interface of the radio communication terminal such as a cellular phone. As such, if the radio communication terminal is a personal device, and the electronic apparatus is a shared apparatus, the present invention shows the most beneficial effects.

The user interface setting specification information can include, for example, setting items of user interface (i.e. ID) and the particulars (values). The setting items of the user interface may concern type and size of display font, brightness of display screen, speaker volume (audio output), microphone sensitivity, input means, etc.

It is preferable that the setting items of the user interface of the electronic apparatus particularly include information regarding a language setting.

If a language of the electronic apparatus is set to a language incomprehensible to the user when the user intends to use the apparatus, notification concerning the change of settings made to the user interface of the electronic apparatus by the electronic apparatus will be also made in the language incomprehensible to the user. Therefore, in some cases, it is extremely difficult for the user to change the information regarding the language setting in such a way that the notification is made in a language comprehensible to the user.

An electronic apparatus directed to Europe, for example, is provided with a multi-language user interface. However, there is a problem in that it is difficult for the user to change a language setting of the electronic apparatus from the language incomprehensible to the language comprehensible to the user.

However, the aforementioned problem can be eliminated if the electronic apparatus sets up the user interface of the electronic apparatus according to the information regarding the language setting of the radio communication terminal and the notification with respect to the electronic apparatus can be made in the language used in the radio communication terminal.

Such information regarding the settings of the user interface stored in the radio communication terminal can be static as part of a specification of the radio communication terminal. For example, if the radio communication terminal is for use in Japanese language only, the information regarding the language setting may be fixed to Japanese.

Also, the settings of the user interface stored in the storage unit of the radio communication terminal may be capable of being changed by the user.

It is preferable that the settings of the user interface stored in the storage unit of the radio communication terminal may be capable of being changed based on a command for changing the settings of the user interface by a user input, etc., for example.

For instance, if the radio communication terminal is capable of supplying information in either Japanese or English language, notification of the information is made in the language corresponding to the information regarding the language setting of the user in the radio communication terminal. The electronic apparatus may set up the user interface according to the information regarding the language setting.

As above, the settings of the user interface of the radio communication terminal that are capable of being changed by the user are, in most cases, set up to be easy to use for the user.

Accordingly, settings of the user interface of the electronic apparatus can be also made to be easy to use for the user.

Particularly, if the radio communication terminal is a portable terminal, such as a cellular phone and PDA, which is frequently carried and used by the user, the settings of the user interface of the terminal are usually changed (customized) by the user.

Therefore, if the radio communication terminal is such a portable terminal, the user can easily change the settings of the user interface of the electronic apparatus to be favorable to the user.

Exchange of the user interface setting specification information between the radio communication terminal and the electronic apparatus can be established as below, for example.

One of the electronic apparatus and the radio communication terminal searches the radio communication terminal or the electronic apparatus located within the predetermined communicable distance from the electronic apparatus or the radio communication terminal, for example. When the search is successful, or the electronic apparatus makes a request after a successful search, the radio communication terminal transmits the user interface setting specification information to the electronic apparatus.

Particularly, the electronic apparatus may detect presence of the radio communication terminal located within the predetermined communicable distance from the electronic apparatus and request transmission of the user interface setting specification information from the detected radio communication terminal. In this case, the radio communication terminal transmits the user interface setting specification information when it receives the request for transmission.

With the above constitution, when the electronic apparatus detects the radio communication terminal located within the predetermined communicable distance, it can obtain the user interface setting specification information from the detected radio communication terminal and set up the user interface.

The radio communication terminal may transmit the user interface setting specification information when it receives a request signal from the electronic apparatus. Otherwise, the radio communication terminal may transmit the user interface setting specification information once it detects a search signal from the electronic apparatus.

Particularly, the electronic apparatus transmits the search signal for searching the radio communication terminal located within the predetermined communicable distance from the electronic apparatus, and the radio communication terminal transmits the user interface setting specification information to the electronic apparatus when it receives the search signal.

In this manner, when the electronic apparatus transmits the search signal (which is called inquiry in Bluetooth, in particular), the user interface of the electronic apparatus is switched to the environment corresponding to the user interface setting specification information received from the radio communication terminal.

The electronic apparatus, for example, can always keep the user interface to correspond to the settings of the user interface stored in the radio communication terminal located within the predetermined communicable distance from the electronic apparatus, by conducting a search for the radio communication terminal at appropriate time intervals.

Furthermore, the electronic apparatus can be designed to transmit the search signal according to a command for the search inputted by the user, and can set up the user interface based on the user interface setting specification information transmitted from the radio communication terminal in response to the search signal.

As above, the electronic apparatus can be designed to detect or search the radio communication terminal located within the predetermined communicable distance from the electronic apparatus, or the radio communication terminal can be designed to detect or search the electronic apparatus.

In the environment setup system, for example, the radio communication terminal may be designed to detect presence of the electronic apparatus located within the predetermined communicable distance from the radio communication terminal and transmit the user interface setting specification information to the detected electronic apparatus.

In the above manner, when the radio communication terminal detects presence of the electronic apparatus, the settings of the user interface of the electronic apparatus can be switched to the settings which correspond to the settings of the user interface stored in the radio communication terminal.

For example, the radio communication terminal transmits the search signal for searching the electronic apparatus located within the predetermined communicable distance from the radio communication terminal, and the electronic apparatus transmits the response signal when it receives the search signal. The radio communication terminal transmits the user interface setting specification information when it receives the response signal.

In this manner, for example, when the search for the electronic apparatus from the radio communication terminal is detected and the electronic apparatus responds, the radio communication terminal can transmit the user interface setting specification information to the electronic apparatus.

On the other hand, the radio communication terminal may transmit the search signal for searching the electronic apparatus located within the predetermined communicable distance from the radio communication terminal, the electronic apparatus may request transmission of the user interface setting specification information from the radio communication terminal which transmits the search signal when it receives the search signal, and the radio communication terminal may transmit the user interface setting specification information when there is the request for transmission.

With such a constitution, when the electronic apparatus receives the search signal from the radio communication terminal, the electronic apparatus can request and obtain the user interface setting specification information from the radio communication terminal to set up the user interface.

Furthermore, the settings of the user interface stored in the storage unit of the radio communication terminal may include address information regarding the transmission destination of the radio communication terminal.

In this case, it is preferable that the setup unit of the electronic apparatus may be designed to set the electronic apparatus in such a way that the address information specified by the user interface setting specification information received by the reception unit is available in the electronic apparatus.

Such a constitution, for example, allows dispensing with a repeated user input of the address information regarding the transmission destination, when the electronic apparatus is a communication apparatus such as a fax machine and the user of the communication apparatus intends to transmit a copy to the address that can be specified by the address information stored in the radio communication terminal, for example.

It is preferable that the aforementioned address information includes at least one combination of phone number information of transmission destination and name information corresponding to the phone number information for specifying transmission destination.

If the above-described environment setup system is implemented in a computer, functions of the aforementioned various units can be constituted as computer executable programs.

For example, if a built-in computer of the aforementioned electronic apparatus is provided with programs that can implement the functions as the aforementioned reception unit, environment information acquisition unit and setup unit or the functions as the reception unit and setup unit, this electronic apparatus serves as a component of the aforementioned environment setup system.

Moreover, if a built-in computer of the aforementioned radio communication terminal comprising the predetermined user interface is provided with programs that can implement the function as the transmission unit, this radio communication terminal serves as a component of the aforementioned environment setup system.

Accordingly, such programs can achieve the same effects as those realized by the aforementioned environment setup system.

These programs can be stored in a computer readable recording medium such as a flexible disc, optical disc, CD-ROM, hard disc, ROM, RAM, etc. These programs can be loaded to a computer for execution as required, or distributed by the aforementioned recording media or via a network.

BRIEF DESCRIPTION OF THE DRAWING

The invention will now be described, by way of example, with reference to the accompanying drawings, in which:

FIGS. 2A and 2B are explanatory views showing respective constitutions of a device management database and an environment management database;

FIGS. 3A and 3B are explanatory views showing respective constitutions of a user property acquisition information database and a user property management database;

FIGS. 17A and 17B are explanatory views showing a constitution of setting information stored in a cellular phone;

FIGS. 22A, 22B, 23A, 23B, 24A and 24B are explanatory views respectively showing a sample view of a setting information display screen of the MFP according to the second embodiment;

FIGS. 25A, 25B and 25C are diagrams showing MIB definition of SNMP in the environment setup system;

DETAILED DESCRIPTION OF PREFERRED EMBODIMENT

Hereinafter, embodiments of the present invention are described with reference to drawings. The mode of implementation of the present invention should not be limited to the embodiments described below, and other variations may be possible without departing from the technical scope of the present invention.

First Embodiment

Figure 1:
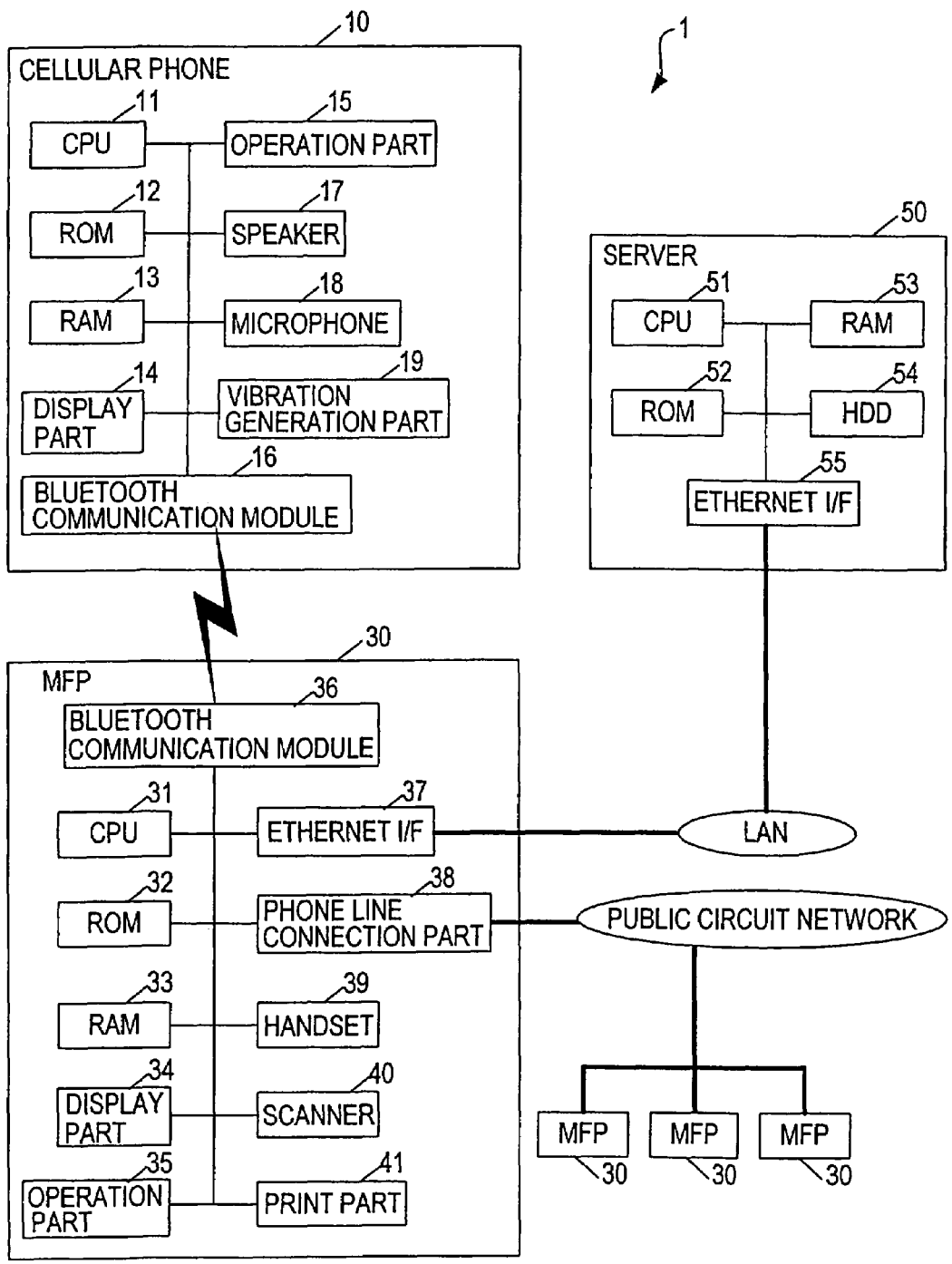
FIG. 1 is a block diagram showing the constitution of an environment setup system according to a first embodiment.

FIG. 1 is a block diagram showing a constitution of an environment setup system 1 of the present embodiment. The environment setup system 1 is provided with a cellular phone 10 as a radio communication terminal, and an MFP (Multi Function Peripheral) 30 which is a complex apparatus as an electronic apparatus.

The MFP 30 mainly comprises a CPU 31, a ROM 32, a RAM 33, a display part 34 such as LCD, an operation part 35 composed of numeric keys, function keys, etc., a Bluetooth communication module 36 that establishes radio communication based on the Bluetooth standard, an Ethernet interface (I/F) 37 which is a communication interface with a LAN, a phone line connection part 38, designed to be connected to a public circuit network, that controls incoming and outgoing transmission and exchanges data with other fax machines via the public circuit network, a handset 39 for communication, a scanner 40 for reading a copy, and a print part 41 that performs printing to paper.

In the MFP 30, the CPU 31 runs programs stored in the ROM 32 to handle various processes.

For example, the MFP 30 controls the Ethernet I/F 37 and Bluetooth communication module 36 to execute a reception process for receiving printing data transmitted from other apparatuses and a print process for printing data by controlling the print part 41 according to the received data.

In addition, the MFP 30 handles a fax transmission process that controls the phone line connection part 38 based on the received data to transmit the data to another MFP 30 via the public circuit network, and a fax reception process that controls the print part 41 to print the data received by the phone line connection part 38 from another MFP 30 via the public circuit network.

The MFP 30 further executes other various processes generally performed in the complex apparatus.

For example, the MFP 30 executes a phone call process that stores transmission destination information which specifies transmission destination when a phone call is made as transmission record information, outputs ringtones from a not shown speaker and the like when the phone rings, and controls the handset 39 and phone line control part 38, etc. to establish communication, a copy process that controls the scanner 40 and print part 41 for making a copy of an original copy read by the scanner 40 to another paper, an address book management process for editing and utilizing address book data (address information), etc.

The RAM 33 comprises an NVRAM which is a nonvolatile memory. The NVRAM stores a device management database and an environment management database shown in FIGS. 2A and 2B.

The environment management database stored in the NVRAM includes a transmission record database for storing transmission record data, and an address book database for storing the address book data.

The transmission record database and address book database are composed of a default database and a personal database of each user, respectively. The transmission record database stores phone numbers of transmission destination. The address book database stores a phone number and name (company name), etc.

The device management database stores a device name, device address (BD address) and user name in association with each other as shown in FIG. 2A.

The environment management database stores the user name stored in the device management database in association with setting information of each user, such as information regarding hear volume, speak volume, font, font size, and display language (charset), information specifying the database storing the transmission record data, and information specifying the database storing the address book data, as shown in FIG. 2B.

The MFP 30 also comprises a user property acquisition information database and a user property management database shown in FIGS. 3A and 3B in the NVRAM of the RAM 33.

The user property acquisition information database stores the user name stored in the device management database in association with property information regarding user properties, that is, information regarding nationality, age, etc. specified by the user name, as shown in FIG. 3A.

The user property management database stores the information regarding nationality in association with the information regarding display language and font, as well as the information regarding age in association with the information regarding font size, as shown in FIG. 3B.

In a default setting of the MFP 30, the MFP 30, when it is powered, copies settings in a row having a user name "default" of the environment management database shown in FIG. 2B to an environment storage area in the RAM 33. The MFP 30 executes the aforementioned processes according to the setting information stored in the environment storage area.

In the communication process, for example, the MFP 30, when a phone rings, refers to a setting value regarding hear volume stored in the storage area to output ringtones corresponding to the setting value, while it refers to a setting value regarding speak volume to adjust a volume during the call to the setting value.

The MFP 30, when it requires a user input or supplying information to a user, shows information in the display part 34 in the aforementioned processes. At this time, the MFP 30 indicates the information in the display part 34 according to the information regarding font, font size and display language stored in the environment storage area. The MFP 30 also refers to the environment storage area to use the corresponding information regarding the transmission record and address book.

A communication range of the Bluetooth communication module 36 of the MFP 30 is in a radius of a few meters (e.g. 5 m) from the MFP 30. The MFP 30 can communicate with the cellular phone 10 within the range.

Figure 4:
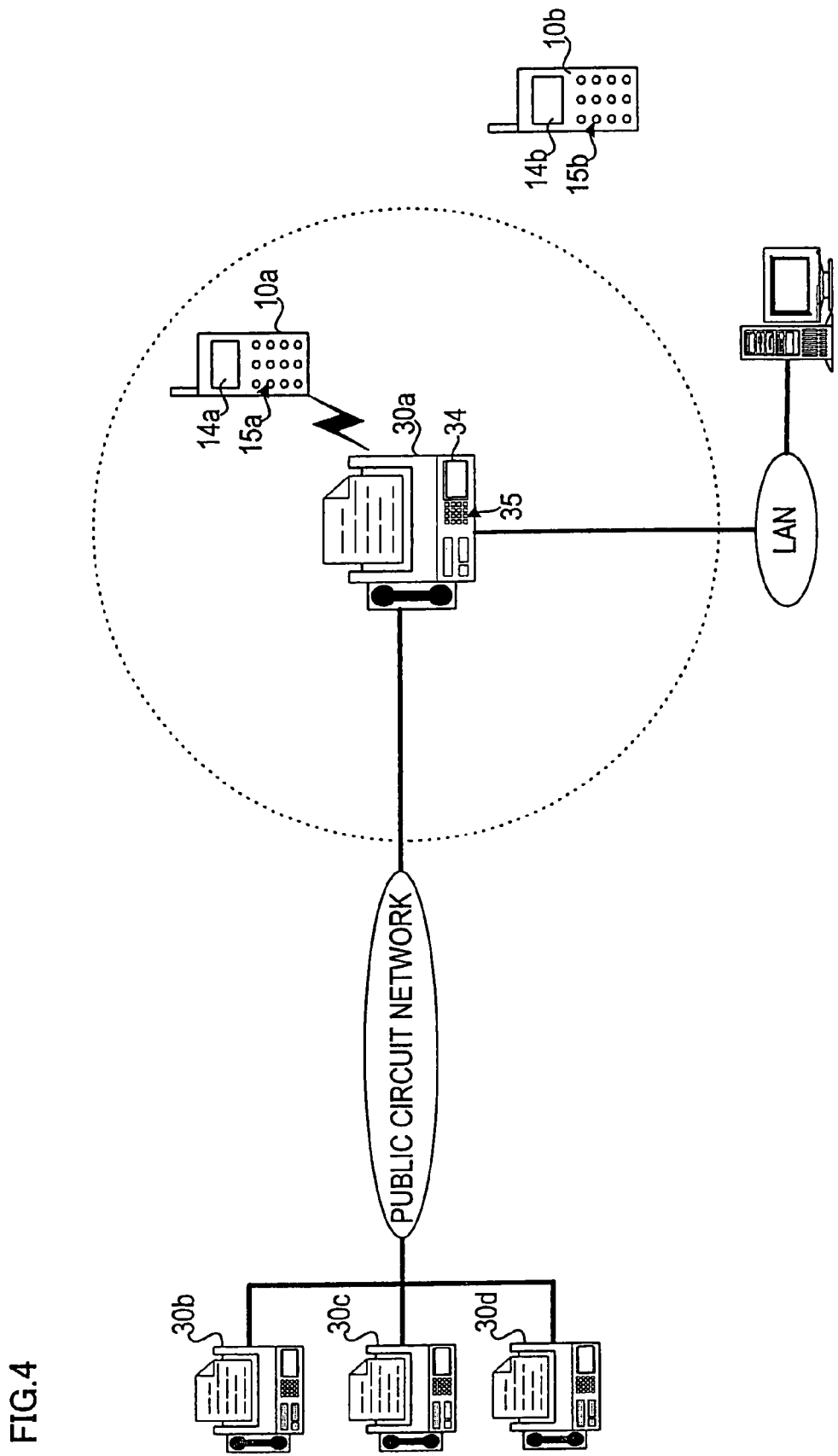
FIG. 4 is an explanatory view showing a communication range of an MFP according to the first embodiment.

For example, when the MFP 30 is an MFP 30a shown in FIG. 4 and the communication range is within a range shown in dotted lines, a cellular phone 10a shown in FIG. 4 can communicate with the MFP 30a, while a cellular phone 10b shown in FIG. 4 cannot communicate with the MFP 30a.

In short, the MFP 30 can communicate with the cellular phone 10 when a user carrying the cellular phone 10 approaches the MFP 30.

As shown in FIG. 1, the cellular phone 10 is a typical cellular phone mainly comprising a CPU 11, a ROM 12, a RAM 13, a display part 14 such as LCD, an operation part 15 composed of numeric keys, function keys, etc., a speaker 17, a microphone 18, and a vibration generation part 19. In addition, the cellular phone 10 comprises a Bluetooth communication module 16 which establishes radio communication based on the Bluetooth standard.

The CPU 11 of the cellular phone 10 runs programs stored in the ROM 12 so that the cellular phone 10 can control the aforementioned respective parts. The cellular phone 10 executes processes generally performed in a typical cellular phone, such as a communication process, an electronic mail process, a browser process, etc. as well as a communication process by the Bluetooth communication module 16.

An NVRAM which is a nonvolatile memory included in the RAM 13 of the cellular phone 10 stores as setting information a Bluetooth device address (BD address) and device name to be transmitted from the Bluetooth communication module 16 when communication is established.

The NVRAM of the RAM 13 of the cellular phone 10 also stores information regarding age, nationality, sex, etc. of a user of the cellular phone 10 (property information of the user of the cellular phone 10) and address book data regarding the transmission destination of the cellular phone 10 (address information including phone number information and name information, etc. of transmission destination) as setting information.

The MFP 30 communicates with the cellular phone 10 located close to the MFP 30 via the Bluetooth communication module 36. After specifying the user of the cellular phone 10, the MFP 30 switches an environment of the MFP 30 to an environment corresponding to the user. The aforementioned processes of the MFP 30 are executed in the environment set up in this process.

Hereafter, a main process (including an environment setup process) performed by the MFP 30 through the communication with the cellular phone 10 is explained by way of FIGS. 5-11.

Figure 5:
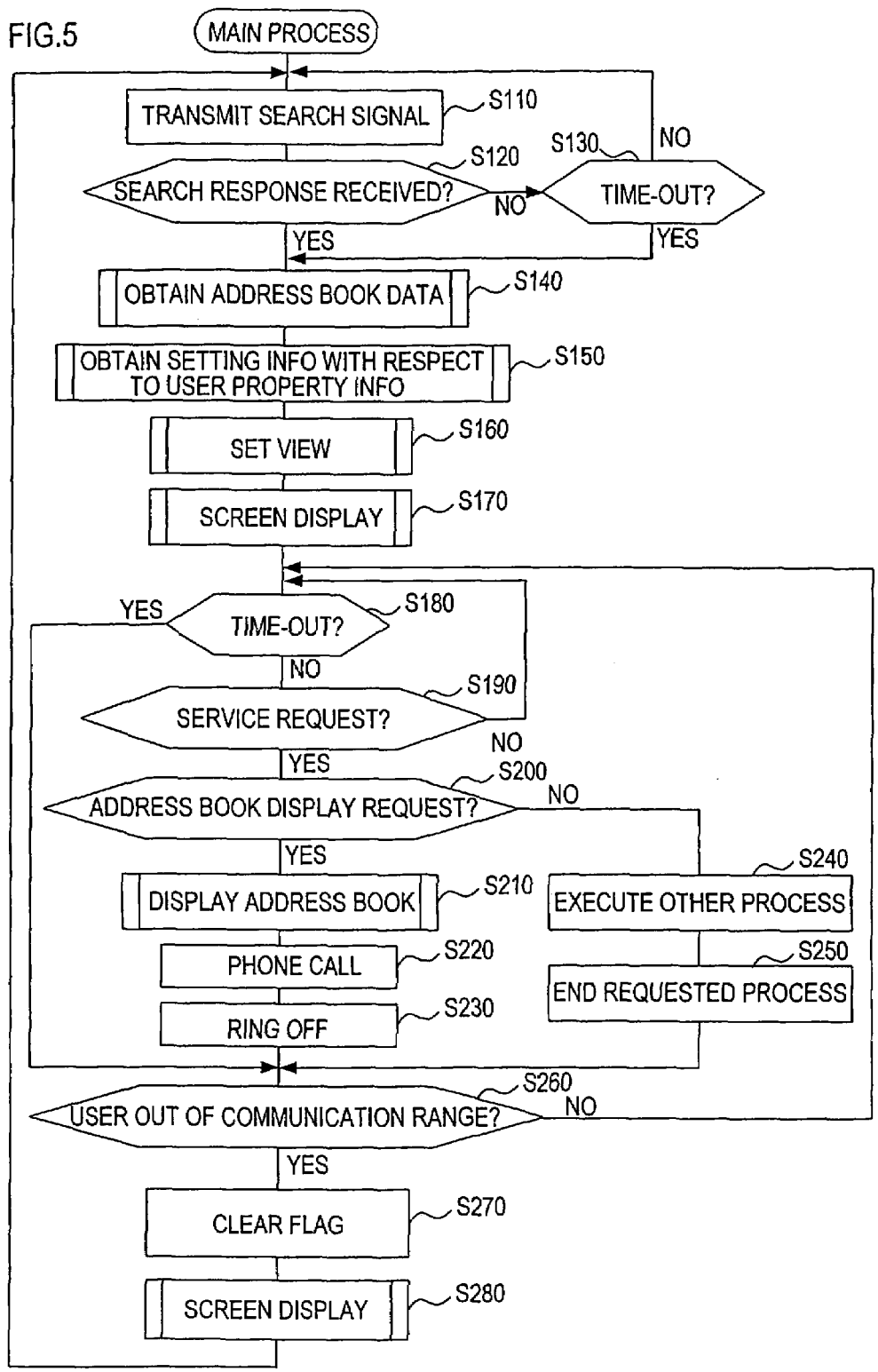
FIG. 5 is a flowchart showing a flow of a main process of the MFP according to the first embodiment.
Figure 6:
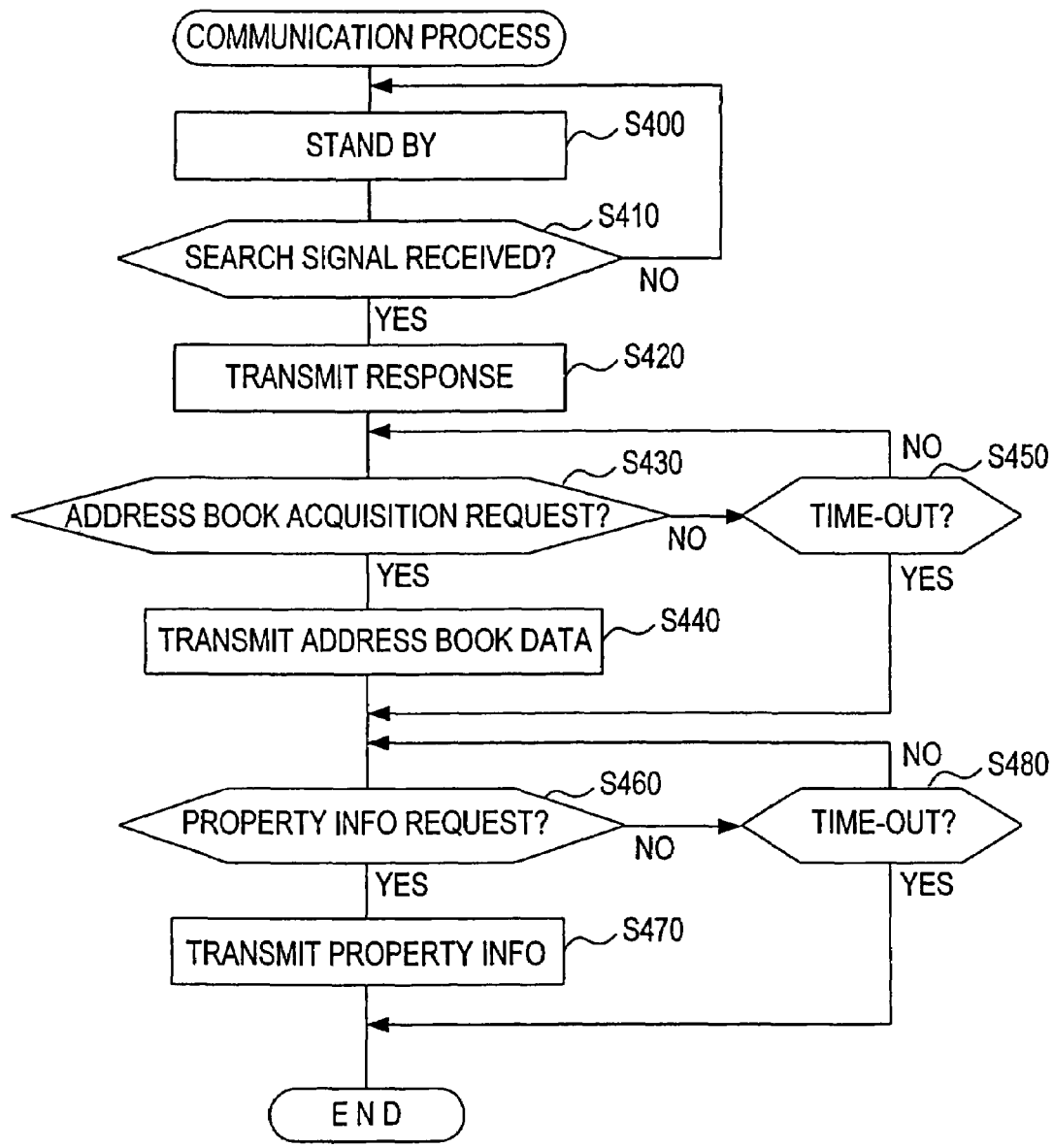
FIG. 6 is a flowchart showing a flow of a communication process of a cellular phone with the MFP according to the first embodiment.

FIG. 5 is a flowchart showing a flow of the main process by the MFP 30. FIG. 6 is a flowchart showing a flow of the communication process by the cellular phone 10.

As shown in FIG. 5, the CPU 31 of the MFP 30 firstly transmits a communication partner search signal (inquiry) from the Bluetooth communication module 36 in step S110. In subsequent step S120, the CPU 31 determines whether the Bluetooth communication module 36 has received a communication partner search response from the cellular phone 10. When the module 36 has not received the communication partner search response (S120: NO), the process moves to step S130. In step S130, it is determined whether a predetermined time-out period has passed since the step S110 was initially performed. If it is determined that the time-out period has not passed in step S130 (S130: NO), the process returns to step S110.

On the other hand, the CPU 11 of the cellular phone 10, after standing by (S400), determines whether the Bluetooth communication module 16 has received the communication partner search signal (inquiry) (S410), as shown in FIG. 6. When the module 16 has received the communication partner search signal (S410: YES), the process moves to step S420. If it has not received the communication partner search signal (S410: NO), the process returns to step S400. In step S420, the communication partner search response including the BD address and device name stored in the NVRAM of the RAM 13 is transmitted from the Bluetooth communication module 16. The process moves to step S430.

In the MFP 30, if the module 36 receives the communication partner search response (S120 of FIG. 5: YES), or if it is determined that the time-out period has passed in step S130 (S130: YES), the process moves to step S140.

In step S140, an address book data acquisition process is executed. This process is explained in detail referring to FIG. 7.

In the address book data acquisition process, the MFP 30 firstly obtains the BD address and device name from response information included in the communication partner search response in step S610, and the process moves to step S620. If a negative determination is made in the aforementioned step S120 (S120: NO) and a positive determination is made in step S130 (S130: YES), the process moves to step S620 skipping step S610.

In step S620, it is determined whether the BD address is successfully obtained. If it is determined successful (S620: YES), the process moves to step S630. If it is determined unsuccessful (S620: NO), the address book data acquisition process is ended. As in the above, when step S610 is skipped, a negative determination is made in step S620 (S620: NO).

In step S630, an address book data acquisition request signal is transmitted from the Bluetooth communication module 36. In subsequent step S640, it is determined whether the Bluetooth communication module 36 has received an address book data acquisition response from the cellular phone 10.

If the module 36 has not received the address book data acquisition response (S640: NO), the process moves to step S650. In step S650, it is determined whether the predetermined time-out period has passed since step S630 was initially performed. If it is determined in step S650 that the time-out period has not passed (S650: NO), the process returns to step S630, while if it is determined that the time-out period has passed (S650: YES), the address book data acquisition process is ended.

The CPU 11 of the cellular phone 10 determines whether the Bluetooth communication module 16 has received the address book data acquisition request signal in step S430, as shown in FIG. 6.

If the module 16 has received the address book data acquisition request signal (S430: YES), the process moves to step S440, while if the module 16 has not received the address book data acquisition request signal (S430: NO), the process moves to step S450.

In step S440, the address book data including the phone number information and name information, etc. of transmission destination stored in the RAM 13 in combination with the BD address and device name stored in the RAM 13 is transmitted from the Bluetooth communication module 16 as the address book data acquisition response. Then, the process moves to step S460.

In step S450, it is determined whether the predetermined time-out period has passed since step S430 was initially performed. If it is determined that the time-out period has not passed in step S450 (S450: NO), the process returns to step S430, while if it is determined that the time-out period has passed (S450: YES), the process moves to step S460.

Figure 7:
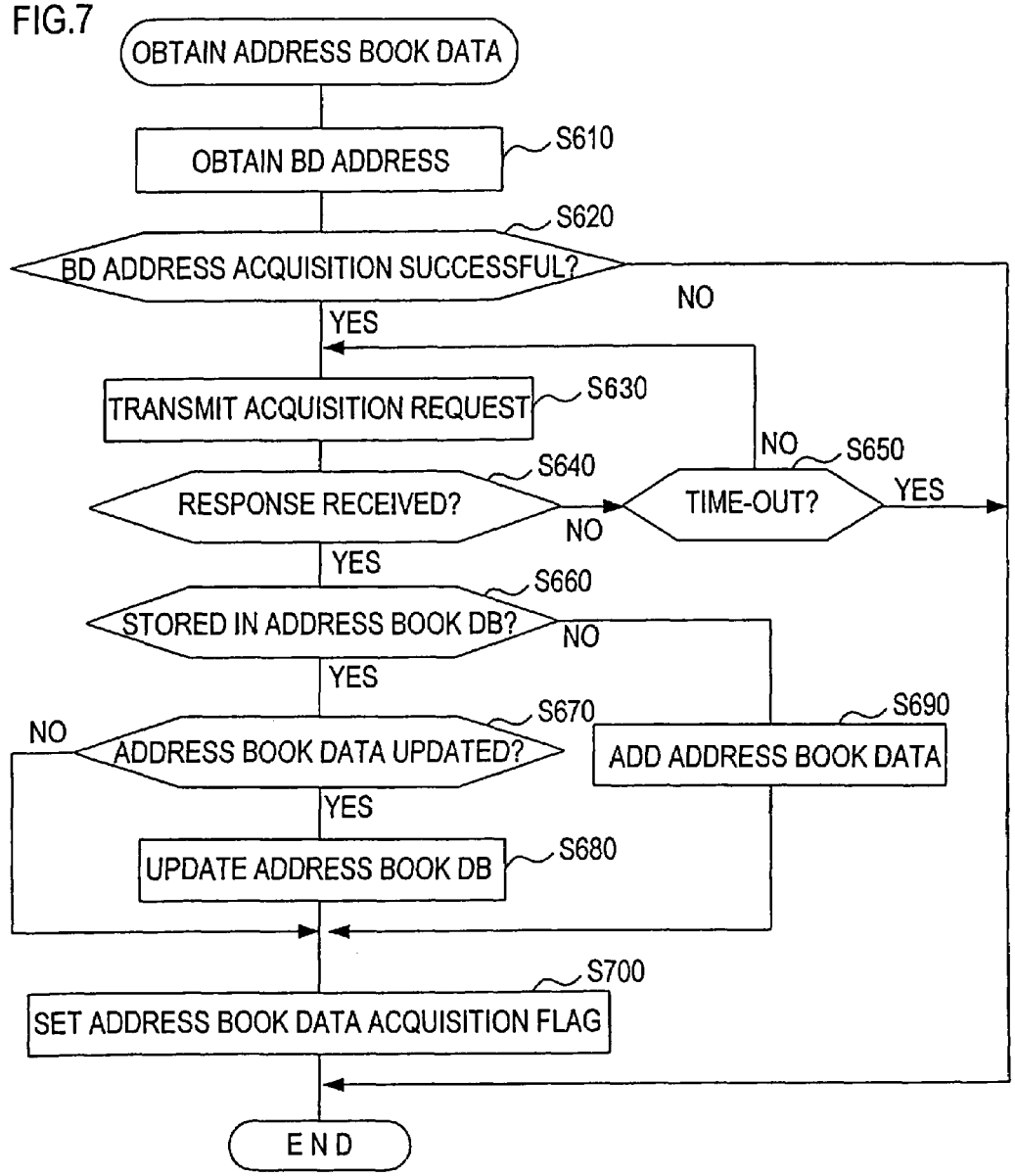
FIG. 7 is a flowchart showing a flow of an address book data acquisition process of the MFP according to the first embodiment.

In the MFP 30, if the Bluetooth communication module 36 has received the address book data acquisition response from the cellular phone 10 (S640 of FIG. 7: YES), the process moves to step S660.

In step S660, it is determined whether the address book data corresponding to the BD address and device name obtained in step S640 is already stored in the NVRAM of the RAM 33.

Particularly, for example, the above determination is made in the following manner. Firstly, it is determined whether the BD address received in step S640 (or S120) is stored in the device management database shown in FIG. 2A. If it is determined that the BD address is stored, the corresponding user name is obtained from the device management database. Then, the CPU 31 determines whether the information specifying the database storing the address book data is included in the data in the environment management database (FIG. 2B) associated with the user name. Here, if it is determined that the information is included, it is assumed that a positive determination is made in step S660 (S660: YES), and the process moves to step S670. On the other hand, if it is determined that the BD address received in step S640 (or S120) is not stored in the device management database shown in FIG. 2A, or it is determined that the information specifying the database storing the corresponding address book data is not included in the environment management database, it is assumed that a negative determination is made in step S660 (S660: NO), and the process moves to step S690.

In step S670, it is determined whether it is necessary to update the address book data in the RAM 33 which is found in step S660.

Particularly, the determination is made as in the following, for example. That is, the CPU 31 compares update time data included in the address book data currently stored in the RAM 33 with the update time data included in the address book data received from the cellular phone 10 in step S640. If the former update time data shows earlier time than the latter, it is determined that the update should be performed (S670: YES), and the process moves to step S680. In other cases, it is determined that the update is not necessary (S670: NO), and the process moves to step S700.

If the process moves from step S670 to S680, the address book data in the RAM 33 which is found in step S660 is updated to the address book data received from the cellular phone 10 in step S640 (S680), and the process moves to step S700.

In step S690, the address book data received from the cellular phone 10 in step S640 is added to the address book database in the RAM 33, and the process moves to step S700.

If the user name associated with the added address book data is not stored in the RAM 33, the CPU 31 may provide an input box or the like for the user name input in the display part 34, urge the user to input the user name from the operation part 35, and store the user name in the environment management database in association with the aforementioned added address book data.

In step S700, an address book data acquisition flag is set. Particularly, a variable corresponding to the address book data acquisition flag in the RAM 33 is set to a predetermined value such as 1. Then, the address book data acquisition process is ended.

In the MFP 30, if the address book data acquisition process (S140 of FIG. 5) is executed as above, the process is moved to step S150. In step S150, a setting information acquisition process with respect to the user property information is executed. This process is explained in detail referring to FIG. 8.

In the setting information acquisition process, firstly in step S810, the BD address and device name are obtained from the response information included in the communication partner search response, and the process moves to step S820. If a negative determination is made in the aforementioned step S120 (S120: NO) and if a positive determination is made in step S130 (S130: YES), the process moves to step S820 skipping step S810.

In step S820, it is determined whether the BD address is successfully obtained. If it is determined successful (S820: YES), the process moves to step S830, and if it is determined unsuccessful (S820: NO), the setting information acquisition process is ended. As in the above, when step S810 is skipped, a negative determination is made in step S820 (S820: NO).

Next, in step S830, it is determined whether the user property information associated with the BD address obtained in step S810 is already stored in the user property acquisition information database (FIG. 3A) in the RAM 33.

Particularly, the determination is made in the following steps, for example. Firstly, it is determined whether the BD address obtained in step S810 is stored in the device management database shown in FIG. 2A. If it is determined that the BD address is stored, the corresponding user name is obtained from the device management database. Then, the CPU 31 determines whether the property information corresponding to the user is stored in the user property acquisition information database (FIG. 3A). Here, if a negative determination is made, or if it is determined that the BD address obtained in step S810 is not stored in the device management database shown in FIG. 2A, it is assumed that a negative determination is made in step S830 (S830: NO), and the process moves to step S840. On the other hand, if it is determined that the property information corresponding to the user specified in the device management database is stored in the user property acquisition information database, it is assumed that a positive determination is made in step S830 (S830: YES), and the process moves to step S870.

In step S840, a property information acquisition request signal is transmitted from the Bluetooth communication module 36. If the user name associated with the BD address obtained in step S810 is not stored in the device management database, the following steps may be performed when this request signal is transmitted. That is, the CPU 31 displays an input box or the like for the user name input in the display part 34, urges the user to input the user name from the operation part 35, and stores the user name in the device management database or environment management database.

In subsequent step S850, it is determined whether the Bluetooth communication module 36 has received a property information acquisition response from the cellular phone 10.

If the module 36 has not received the property information acquisition response (S850: NO), the process moves to step S860. In step S860, it is determined whether the predetermined time-out period has passed since step S840 was initially performed. If it is determined that the time-out period has not passed in step S860 (S860: NO), the process returns to step S840, while if it is determined that the time-out period has passed (S860: YES), the setting information acquisition process is ended.

In step S870, a process of acquisition from the RAM 33 of the user property information found in step S830 is performed.

The CPU 11 of the cellular phone 10 determines whether the Bluetooth communication module 16 has received the property information acquisition request signal in step S460, as shown in FIG. 6.

If the module 16 has received the property information acquisition request signal (S460: YES), the process moves to step S470, while if the property information acquisition request signal is not received (S460: NO), the process moves to step S480.

In step S470, the property information indicating age, nationality, etc. of the user stored in the RAM 13 in combination with the BD address and device name stored in the RAM 13 is transmitted from the Bluetooth communication module 16 as the property information acquisition response. Then the communication process is ended for the time being.

In step S480, it is determined whether the predetermined time-out period has passed since step S460 is initially executed. If it is determined in step 480 that the time-out period has not passed (S480: NO), the process returns to step S460, while if it is determined that the time-out period has passed (S480: YES), the communication process is ended for the time being.

Figure 8:
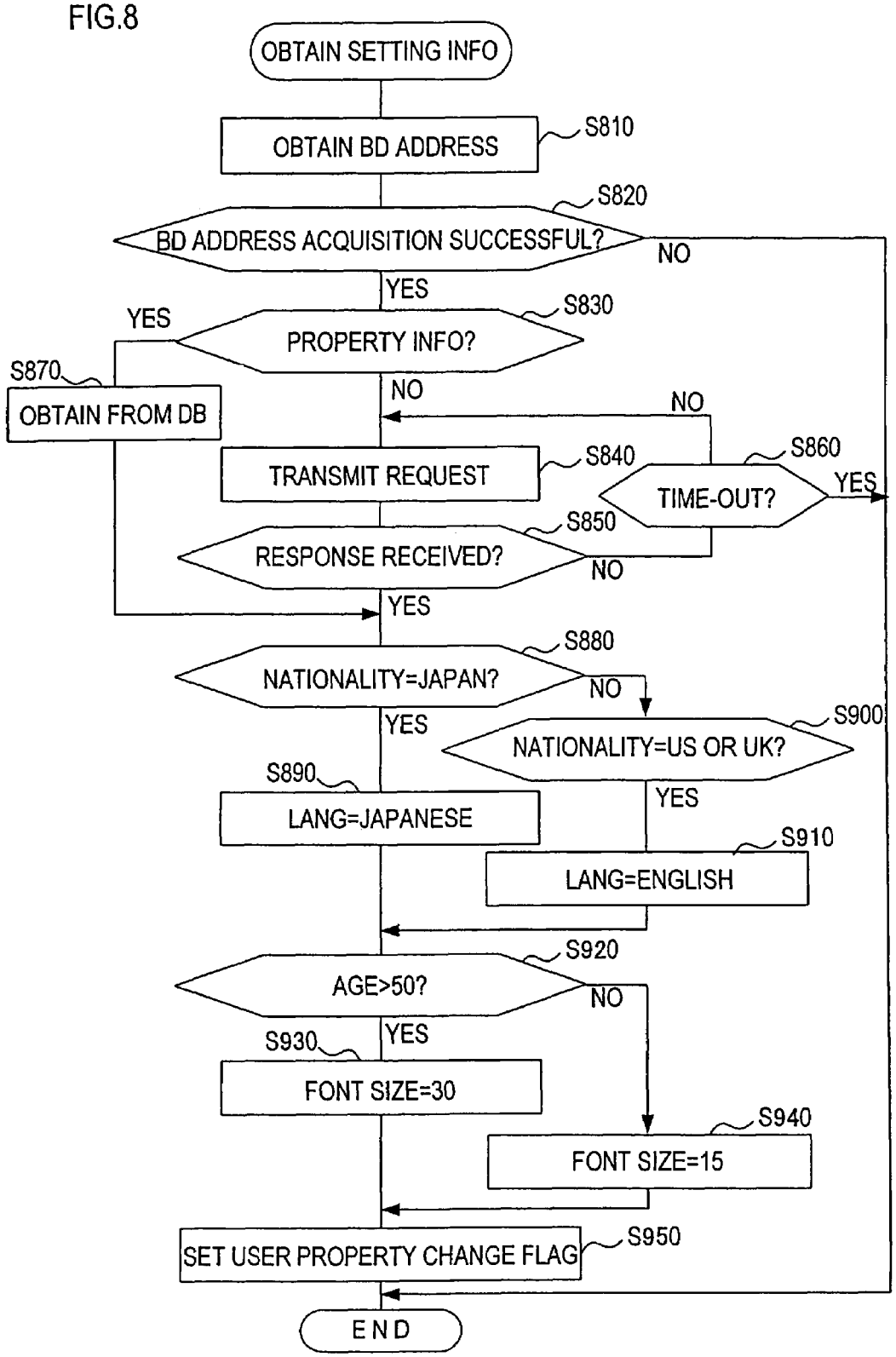
FIG. 8 is a flowchart showing a flow of a setting information acquisition process of the MFP with respect to user property information according to the first embodiment.
Figure 9:
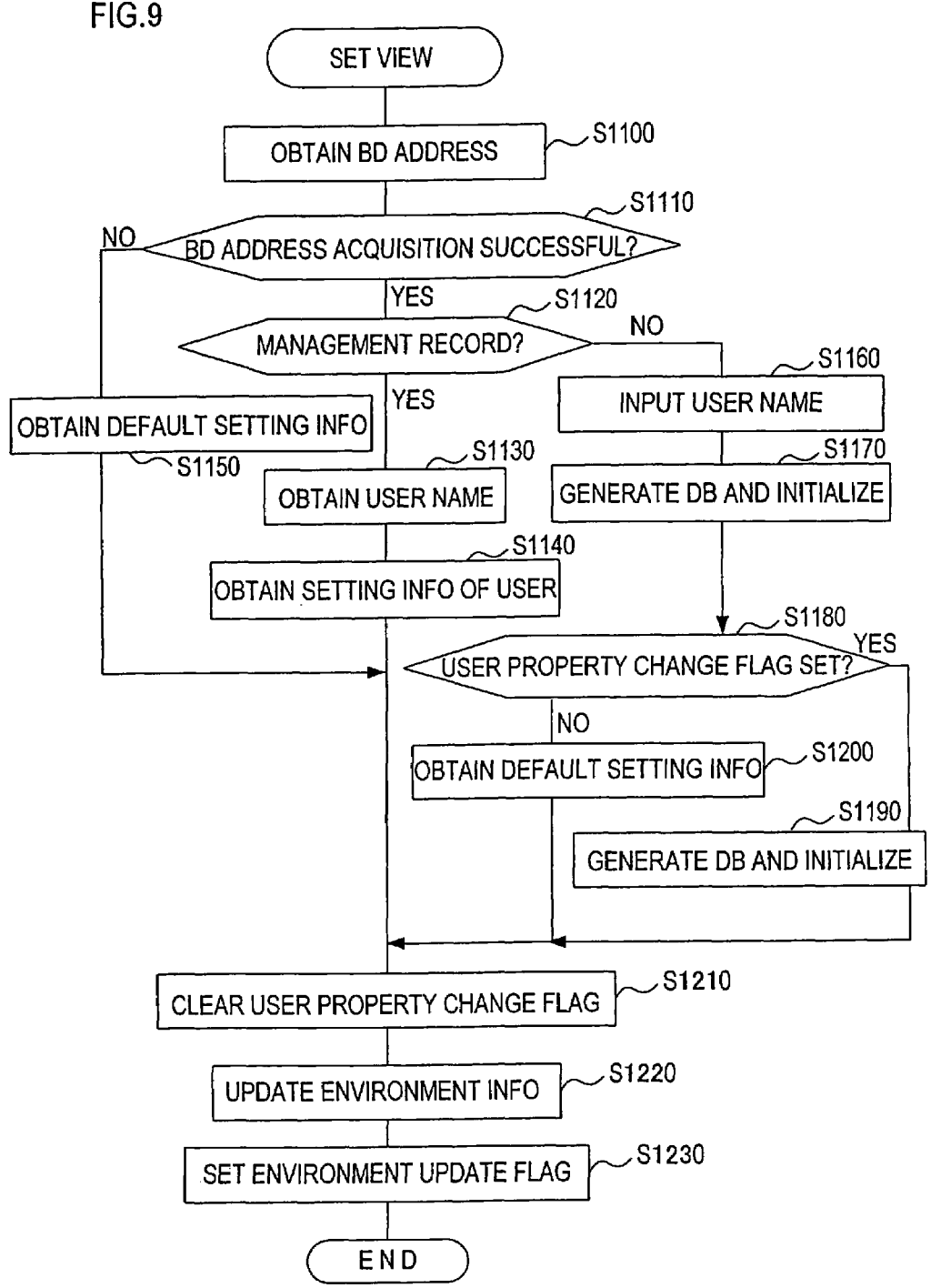
FIG. 9 is a flowchart showing a flow of a view setting process of the MFP according to the first embodiment.

In the MFP 30, if the Bluetooth communication module 36 has received the property information acquisition response from the cellular phone 10 (S850 of FIG. 8: YES), or after step S870, the process moves to step S880.

In step S880, it is determined whether one of the user property information in the property information acquisition response received in step S850 and the information indicating nationality of the user included in the user property information obtained in step S870 shows "Japan" as nationality of the user.

If it is determined that user nationality shows "Japan" (S880: YES), the process moves to step S890, while if it is determined that the user nationality does not show "Japan" (S880: NO), the process moves to step S900.

In step S890, display language and font settings for character information displayed in the display part 34 are set according to the user property management database (FIG. 3B) stored in the RAM 33. Particularly, in step S890, display language and font of the character information are set to "Japanese" and "Gothic", respectively.

In step S900, it is determined whether the information indicating user nationality included in the user property information, which is used for determination in step S880, shows "US" or "UK" as user nationality. If it is positively determined in step S900 (S900: YES), the process moves to step S910, and the display language and font settings of the character information to be displayed in the display part 34 are set to "English" and "times", respectively.

After step S890 or S910, the process moves to step S920, and then, it is determined whether the value indicating the user age included in the user property information which is used for determination in step S880 exceeds "50".

If it is determined in step S920 that the value exceeds "50" (S920: YES), the process moves to step S930, while if it is determined that the value is less than "50" (S920: NO), the process moves to step S940.

In step S930 or S940, font size of the character information shown in the display part 34 is set according to the user property management database (FIG. 3B) stored in the RAM 33. Particularly, font size of the character information is set to "30" in step S930, and "15" in step S940.

After step S930 or S940, the process moves to step S950. In step S950, a user property change flag is set. Particularly, a variable corresponding to the user property change flag in the RAM 33 is set to a predetermined value such as 1. Then, the setting information acquisition process is ended.

The setting information in steps S890, S910, S930, S940 (setting information based on the user properties) is stored in association with the BD address obtained in step S810 in the RAM 33.

In the above description illustrating the flowchart of FIG. 8, a case is described when the user nationality is one of Japan, US and UK. However, it is also possible to create other variations of display language type for character information shown in the display part 34, considering cases in which the user nationality is other than the aforementioned countries.

In the MFP 30, if the setting information acquisition process (S150 of FIG. 5) is executed as above, the process moves to step S160. In step S160, a view setting process is executed. This process is explained in detail referring to FIG. 9.

In the view setting process, the BD address and device name are firstly obtained from the response information included in the communication partner search response in step S1100, and then the process moves to step S1110. If it is negatively determined in the aforementioned step S120 (S120: NO) and it is positively determined in step S130 (S130: YES), the process moves directly to step S1110 skipping step S1100.

In step S1110, it is determined whether the BD address is successfully obtained. If it is determined positively (S1110: YES), the process moves to step S1120, and if it is determined negatively (S1110: NO), the process moves to step S1150. As in the above, when step S1100 is skipped, a negative determination is made in step S1110 (S1110: NO).

In step S1120, it is determined whether the BD address obtained in step S1100 is stored in the device management database shown in FIG. 2A. If it is determined that the BD address is stored (S1120: YES), the process moves to step S1130, and if it is determined that the BD address is not stored (S1120: NO), the process moves to step S1160.

In step S1130, the user name associated with the BD address obtained in step S1100 is obtained from the device management database (FIG. 2A). In subsequent step S1140, the setting information associated with the user name obtained in step S1130 is obtained from the environment management database (FIG. 2B), and then the process moves to step S1210.

If the BD address is not obtained in step S1110 (S1110: NO), default setting information is obtained from the environment management database in step S1150, and the process moves to step S1210.

If it is determined in step S1120 that the BD address obtained in step S1100 is not stored in the device management database shown in FIG. 2A (S1120: NO), an input box or the like for the user name input is shown in the display part 34 in step S1160, and the user is urged to input the user name from the operation part 35.

In subsequent step S1170, the user name inputted in step S1160 is stored in the device management database in association with the BD address and device name obtained in step S1100. Also, this user name is added to the environment management database, and the default setting information is set to the setting information of the user for initialization.

Next, in step S1180, it is determined whether the user property change flag is set. If the user property change flag is set here, it means that the setting information corresponding to the user property information has been obtained in the aforementioned flow shown in FIG. 8. If it is determined that the user property change flag is set (S1180: YES), the process moves to step S1190, and if it is determined that the user property change flag is not set (S1180: NO), the process moves to step S1200.

In step S1190, the setting information in the above S890, S910, S930 and S940 (setting information based on the user properties) is obtained from the RAM 33 based on the BD address obtained in step S1100, and then the process moves to step S1210.

In step S1200, the default setting information corresponding to the user name added in step S1170 is obtained from the environment management database, and the process moves to step S1210.

In step S1210, the variable corresponding to the user property change flag in the RAM 33 is reset to an initial value such as 0.

In subsequent step S1220, the setting information obtained in step S1140, S1150, S1190 or S1200 is stored in the aforementioned environment storage area in the RAM 33. Accordingly, the succeeding steps in the MFP 30 are executed according to the information stored in the environment storage area.

After step S1220 is performed as above, the process moves to step S1230. In step S1230, an environment update flag is set. Particularly, a variable corresponding to the environment update flag in the RAM 33 is set to a predetermined value such as 1. Then the view setting process is ended.

In the MFP 30, after the above view setting process (S160 of FIG. 5) is performed, the process moves to step S170. In step S170, a screen display process is executed. This process is explained in detail referring to FIG. 10.

In the screen display process, firstly in step S1300, it is determined whether the environment update flag is set. If it is determined that the environment update flag is set (S1300: YES), the process moves to step S1310, and if the environment update flag is not set (S1300: NO), the process moves to step S1320.

In step S1310, the setting information obtained in the aforementioned step S1140, S1150, S1190 or S1200 (FIG. 9) and stored in the environment storage area is obtained.

In step S1320, the default setting information is obtained from the environment management database.

When the screen display process is executed in step S170, the process moves from step S1300 to S1310 since the environment update flag is being set.

In subsequent step S1330, the character information, etc. is shown in the display part 34 based on the setting information obtained in step S1310 or S1320. Then, the screen display process is ended.

Figure 10:
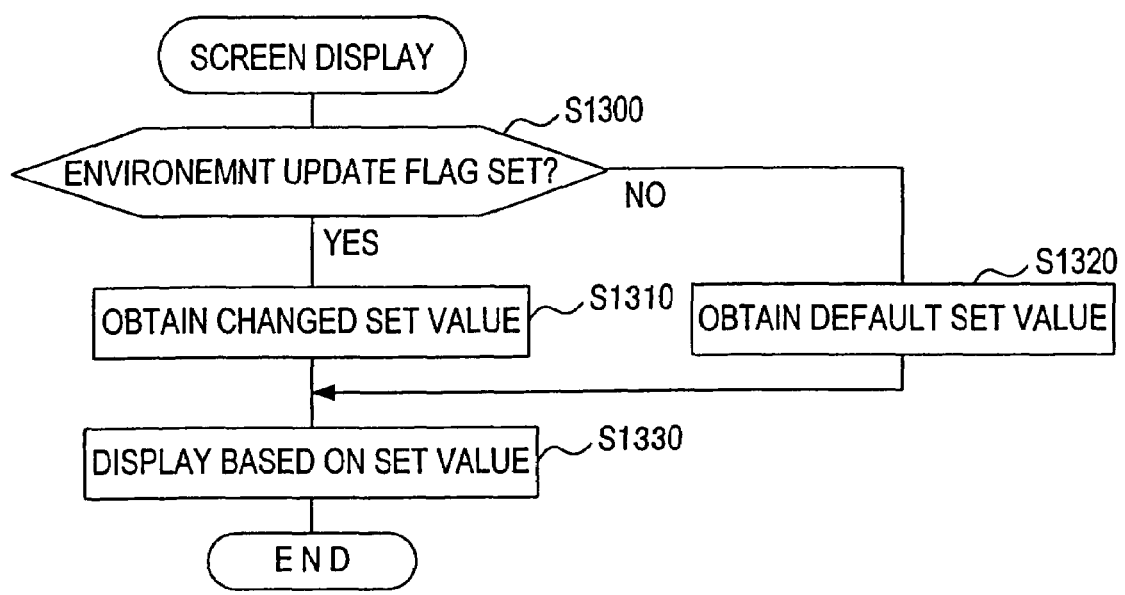
FIG. 10 is a flowchart showing a flow of a screen display process of the MFP according to the first embodiment.
Figure 11:
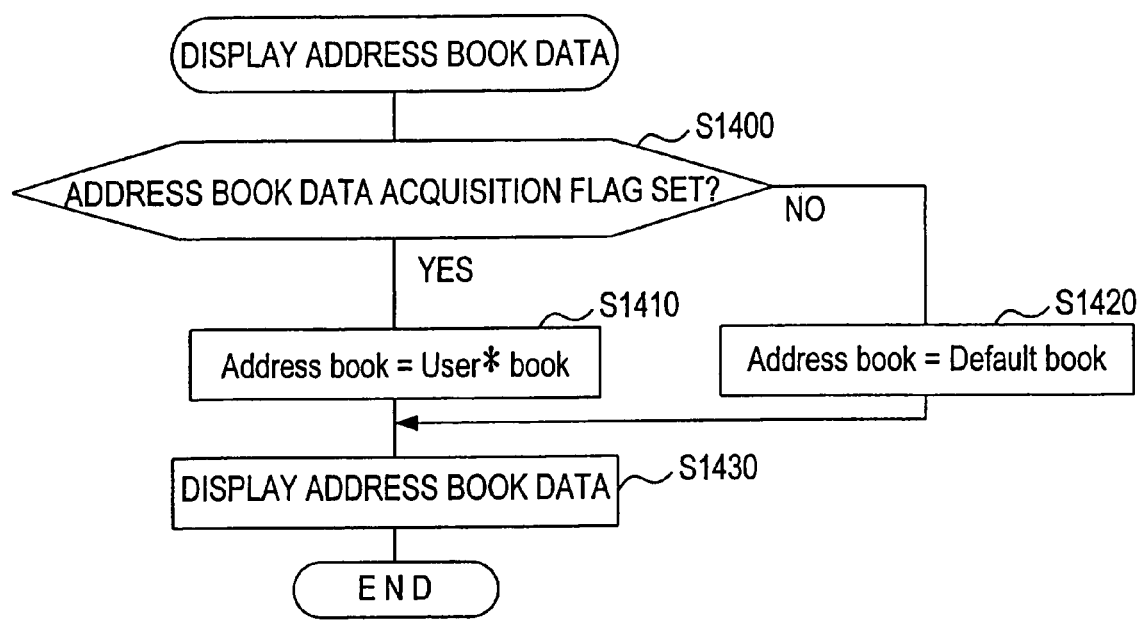
FIG. 11 is a flowchart showing a flow of an address book data display process of the MFP according to the first embodiment.

In the MFP 30, after the screen display process (S170 of FIG. 5) is executed, the process moves to step S180. In step S180, it is determined whether the predetermined time-out period has passed since the display process in step S1330 is executed (FIG. 10). If it is determined in step S180 that the time-out period has not passed (S180: NO), the process moves to step S190, while if it is determined in step S180 that the time-out period has passed (S180: YES), the process moves to step S260.

In step S190, it is determined whether there is a service request for making the MFP 30 execute the print process, etc. by a user input using the operation part 35.

The service request can be also acknowledged by reception of a service request signal transmitted from the Bluetooth communication module 16 of the cellular phone 10 via the Bluetooth communication module 36 of the MFP 30, other than by the user input using the operation part 35. Furthermore, this request can be receiving of the service request signal from other apparatuses located on the LAN via the Ethernet interface (I/F) 37 of the MFP 30.

When it is determined in step S190 that the service request is received (S190: YES), the process moves to step S200. When it is determined in step S190 that the service request is not received (S190: NO), the process returns to step S180.

In step S200, it is determined whether the service request received in step S190 includes a request for showing the address book data in the display part 34. When it is determined that such a display request is included in the service request (S200: YES), the process moves to step S210, while when it is determined that such a request is not included (S200: NO), the process moves to step S240.

In step S210, the address book data display process is executed. This process is explained in detail referring to FIG. 11.

In the address book data display process, it is firstly determined in step S1400 whether an address book data acquisition flag is set. When it is determined that the address book data acquisition flag is set (S1400: YES), the process moves to step S1410, and when it is determined that the address book data acquisition flag is not set (S1400: NO), the process moves to step S1420.

In step S1410, the address book data associated with the user name of the cellular phone 10 is obtained from the address book database (FIG. 2B).

This acquisition process may be executed in the following manner. Particularly, for example, the user name corresponding to the BD address obtained in the aforementioned process (step S610 of FIG. 7, for example) is obtained from the device management database (FIG. 2A), and the address book data associated with the obtained user name is obtained by referring to the address book database (FIG. 2B).

In step S1420, the address book database (FIG. 2B) is referred to to obtain the default address book data.

After the aforementioned acquisition process of step S1410 or S1420 is completed, step S1430 is performed. In step S1430, information regarding phone number and name (company name, etc.) in the address book data obtained in step S1410 or S1420 is shown in the display part 34. Then, the address book data display process is ended.

In the aforementioned step S1410, it is preferable that the transmission record data relating to the user name of the cellular phone 10, in addition to the address book data, is obtained from the transmission record database (FIG. 2B). In the aforementioned step S1420, it is preferable that the default transmission record data, in addition to the address book data, is obtained from the transmission record database (FIG. 2B). In this case, it is preferable that in step S1430, both of the information included in the address book data obtained in step S1410 or S1420 and the information included in the transmission record data are shown in the display part 34.

In the MFP 30, after the address book data display process (S210 of FIG. 5) is executed, the process moves to step S220.

In step S220, processes such as a fax transmission process and a communication process are executed based on a user input for command information. At this time, it is preferable that the user can easily input the information specifying transmission destination via the operation part 35 using the address book data shown in step S210.

After the processes such as fax transmission process, etc. performed in step S220 end in subsequent step S230, the process moves to step S260.

If it is determined in step S200 that a request for showing address book data is not included in the service request (S200: NO), other processes corresponding to the service request are performed in step S240.

When the process performed in step S240 is completed in subsequent step S250, the process moves to step S260.

In step S260, it is determined whether there is no user carrying the cellular phone 10 within the predetermined communicable distance from the Bluetooth communication module 36.

The above determination may be made in the following manner, for example.

Firstly, as is the case with the aforementioned step S110, the communication partner search signal (inquiry) is transmitted from the Bluetooth communication module 36.

Then, the CPU 31 determines whether a response signal to the above signal is received from the cellular phone 10 located within the predetermined communicable distance from the Bluetooth communication module 36 within a predetermined time.

If it is determined that the response signal is received within the predetermined time, the CPU 31 determines that the there is a user carrying the cellular phone 10 within the communicable distance from the Bluetooth communication module 36 (S260: NO), and the process moves to step S180.

In other cases, the CPU 31 determines that there is no user carrying the cellular phone 10 within the communicable distance from the Bluetooth communication module 36 (S260: YES), and the process moves to step S270.

In step S270, the variables corresponding to the address book data acquisition flag and environment update flag in the RAM 33 are reset to initial values such as 0, respectively.

In subsequent S280, the screen display process shown in FIG. 10 is performed. In the screen display process performed here, the process moves from step S1300 to S1320 since the environment update flag is not being set.

Accordingly, in subsequent step S1330, the character information, etc. is shown in the display part 34 based on the default setting information obtained from the environment management database.

Particularly, after the screen display using the setting information stored per user of the cellular phone 10 followed by the detection of the cellular phone 10, and after each user is allowed to use the address book and uses a desired service provided by the MFP 30, the environment settings of the MFP 30 are reset to the original settings when there is no user carrying the cellular phone 10 in the vicinity. In this manner, since the environment settings of the MFP 30 are reset to the original settings when no user operates the MFP 30, there is no fear that personal settings of each user are used or peeked by another user. The present invention is advantageous in security and privacy.

Execution of the screen display process in step S280 completes a series of steps in the main process. Accordingly, step S110 is repeated once again.

It is preferable that the setting information of each user in the environment management database (FIG. 2B) can be changed by pressing down a setting change button provided in the operation part 35.

Figure 12:
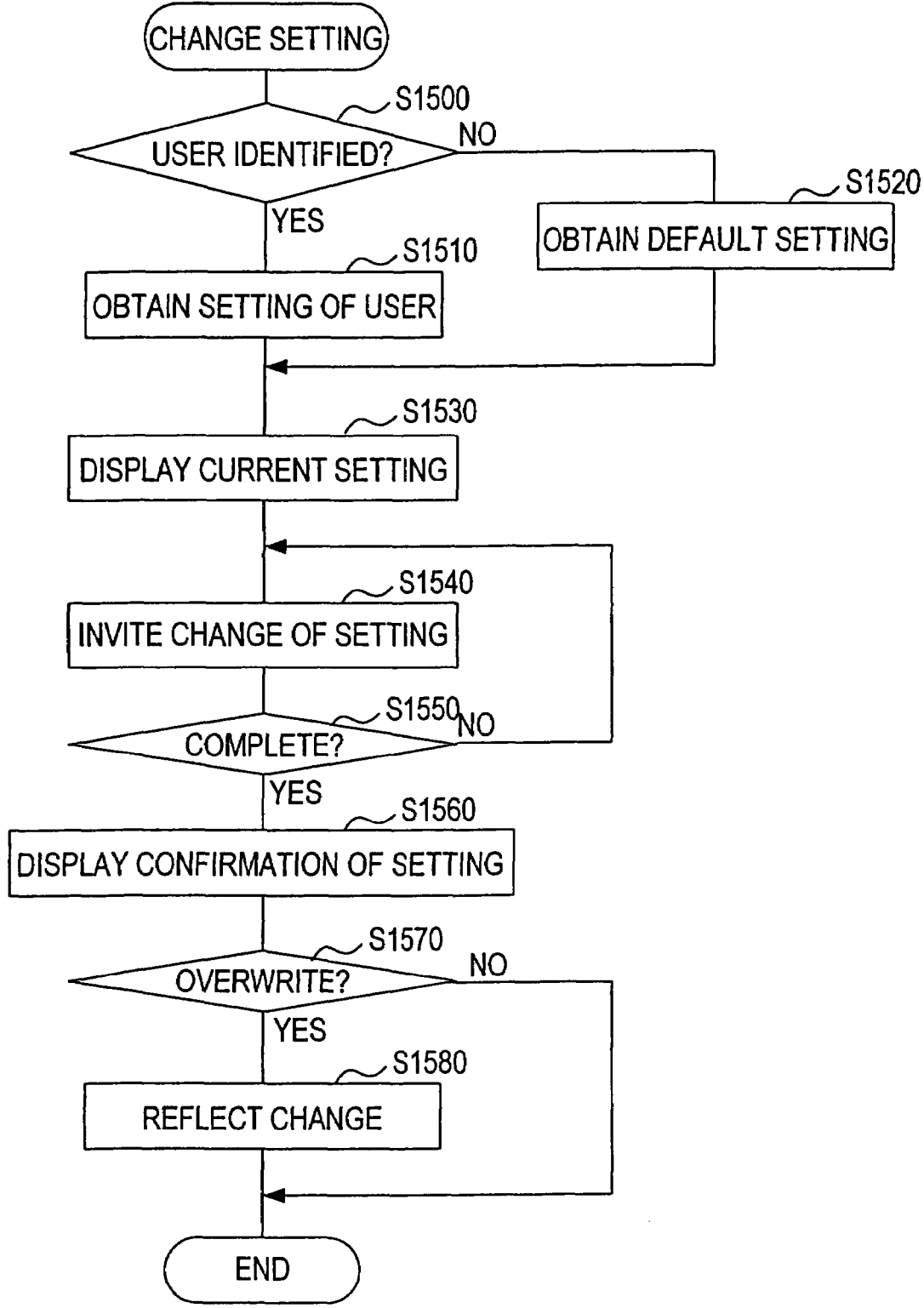
FIG. 12 is a flowchart showing a flow of a setting change process of the MFP according to the first embodiment.

In this case, when the CPU 31 of the MFP 30 detects pressed-down of the setting change button in the operation part 35, the setting change process shown in FIG. 12 is started.

In step S1500 of the above process, it is determined whether the CPU 31 is successful in user identification.

In other words, for example, when the user name is specified based on the BD address obtained from the cellular phone 10 in steps S1100-S1130 of the view setting process (FIG. 9), or when the user name is inputted in step S1160, it is then determined that the user identification is successful.

This determination can be also made by checking whether the user name stored in the environment storage area is "Default", for example.

Particularly, for example, when the user name stored in the environment storage area is default, it may be determined that the user identification is not successful, and when the user name is a specific name other than default, it may be determined that the user identification is successful.

When it is determined in step S1500 that the user identification is successful (S1500: YES), the process moves to step S1510, and a process for obtaining the setting information associated with the user from the environment management database is performed. On the other hand, when it is determined in step S1500 that the user identification is not successful (S1500: NO), the process moves to step S1520, and a process for obtaining the default setting information from the environment management database is performed.

Instead of steps S1500-S1520, a process for obtaining the setting information from the environment storage area may be performed.

In step S1530, the setting information obtained in step S1510 or S1520 is shown in the display part 34. The setting information is, for example, shown as a table shown in FIG. 2B.

In subsequent step S1540, an input command for changing the settings from the operation part 35 is invited. In subsequent step S1550, it is determined whether an input complete command for changing the settings is inputted from the operation part 35. If the input complete command is inputted (S1550: YES), the process moves to step S1560.

In step S1560, the CPU 31 displays a confirmation screen for the setting information in the display part 34, and invites a user input concerning whether the user wishes to overwrite the setting information of the user currently stored in the environment management database to reflect the content shown in the confirmation screen.

In step S1570, when the CPU 31 detects the input command for overwriting from the operation part 35 (S1570: YES), the process moves to step S1580.

In step S1580, the setting information of the user in the environment management database is changed to the setting information provided in step S1540. This setting information is stored in the environment storage area, and then the setting change process is ended.

On the other hand, if there is an input command not to overwrite the setting information (S1570: NO), the setting change process is ended without overwriting.

By enabling the setting change process in the MFP 30, each user can easily change the setting information of their own stored in the environment management database. Particularly, it is not necessary for each user to make any input operation from the operation part 35 when they call the information regarding their own setting information stored in the environment management database. Merely approaching the MFP 30 with their own cellular phone 10 is required. Therefore, change of the setting information becomes easy.

It is preferable that the information regarding a transmission record in the MFP 30 generated when the processes such as the fax transmission process and communication process (S220 of FIG. 5) are executed is stored per each user in the transmission record database (transmission DB; see FIG. 2B) in the RAM 33.

Figure 13:
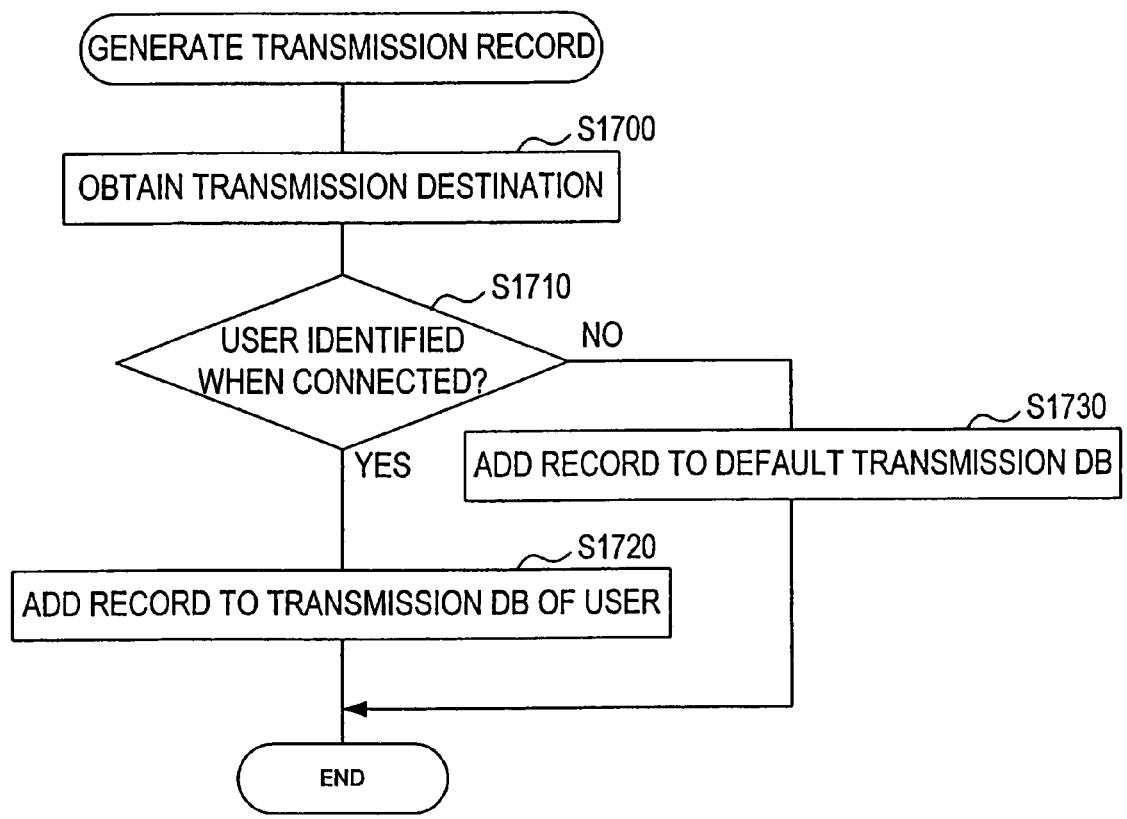
FIG. 13 is a flowchart showing a flow of a transmission record database generation process of the MFP according to the first embodiment.

Particularly, it is preferable that the CPU 31 of the MFP 30 performs the transmission record database generation process shown in FIG. 13 every time the processes such as the fax transmission process and communication process (S220 of FIG. 5) are executed.

In step S1700 of this process, the CPU 31 obtains transmission destination information such as the phone number of transmission destination, etc. used for specifying transmission destination upon the transmission process (fax transmission process or communication process).

In subsequent step S1710, as is the case with step S1500 of FIG. 12, it is determined whether the user identification by the CPU 31 is successful. When it is determined in step S1710 that the user identification is successful (S1710: YES), the process moves to step S1720, and the transmission destination information obtained in step S1700 is added to the transmission record database associated with the user. On the other hand, when it is determined in step S1710 that the user identification is not successful (S1710: NO), the process moves to step S1730 and the transmission destination information obtained in step S1700 is added to the default transmission record database.

As in the above, after step S1720 or S1730 is performed, the transmission record database generation process is ended.

In the above MFP 30, when the user carrying the cellular phone 10 performs the communication process using the MFP 30, the transmission destination information is automatically added to the transmission record database associated with the user.

According to the environment setting system 1 of the present embodiment, each user is identified by the MFP 30 only by approaching the MFP 30 with the cellular phone 10. Then, conditions of the display part 34 of the MFP 30 are changed to conditions corresponding to the identified user. Accordingly, each user can use the MFP 30 as if it is their personal apparatus.

For example, when a user having a user name "Taro" stored in the device management database of FIG. 2A with the cellular phone 10 having a device name "device A" and a BD address "00:10:20:30:**:01" enters within the communicable distance from the MFP 30, the setting information in a row of the user name "Taro" of FIG. 2B is stored in the environment storage area of the RAM 33 in step S160 (FIGS. 5, 9) by the MFP 30.

In the aforementioned respective processes such as the fax transmission process and communication process, etc. in the MFP 30, the setting information stored in the environment storage area is used.

Figure 14A:
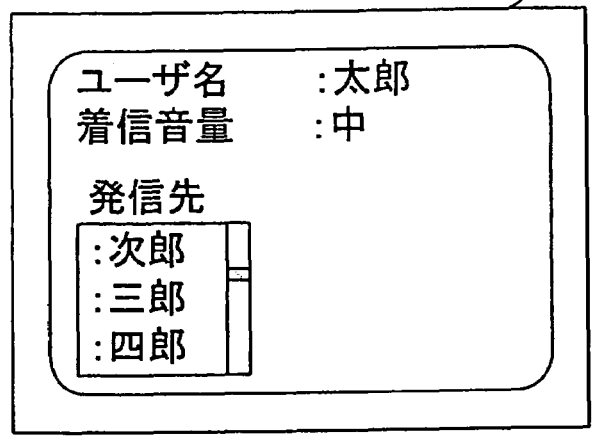
FIGS. 14A, 14B and 14C are explanatory views respectively showing a sample view on a display part of the MFP according to the first embodiment.

For example, in the screen display process of step S170 (FIGS. 5, 10), the character information is displayed in conditions corresponding to the setting information in the row "Taro" (font: gothic, font size: 15, display language: Japanese) in the environment management database (FIG. 2B), as shown in FIG. 14A.

In the address book data display process in step S210 (FIGS. 5, 11), information is obtained from the address book database associated with the user name "Taro" (User1 book) and transmission record database (Transmission DB_A), and the obtained information is shown in the display part 34. This information may be displayed as in a portion indicated as "発信先" (Call) in FIG. 14A, for example.

Figure 14B:
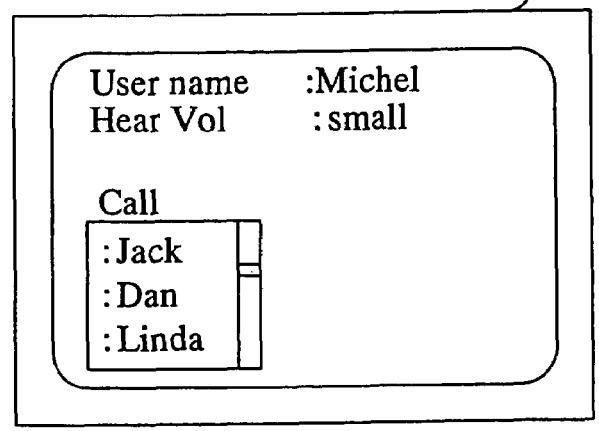

For example, while a user having a user name "Michel" stored in the device management database of FIG. 2A enters within the communicable distance from the MFP 30 with the cellular phone 10 having a device name "device C" and a BD address "00:70:80:90:**:03", the screen display process in step S170 (FIGS. 5, 10) is executed. Then, a screen in conditions shown in FIG. 14B is displayed in the display part 34.

Particularly, the character information is shown in the display part 34 in conditions corresponding to the setting information in the row of "Michel" (font: times, font size: 10, display language: English) in the environment management database (FIG. 2B).

In the address book data display process in step S210 (FIGS. 5, 11), information is obtained from the address book database (User3 book) and transmission record database (Transmission DB_C) associated with the user name "Michel", and the obtained information is shown in the display part 34. This information may be displayed as shown in a portion indicated as "Call" in FIG. 14B, for example.

As a result, in the present embodiment, a view based on the setting information such as the predetermined display language, etc. corresponding to the user is shown in the display part 34 of the MFP 30 when the user carrying the cellular phone 10 just approaches the MFP 30.

The address information and transmission record information shown in the display part 34 here are only from the address book database and transmission record database associated with the user.

Accordingly, each user can use the MFP 30 as their personal apparatus without a fear that the address book database and transmission record database associated with themselves are peeked by another user.

In the present embodiment, for example, when the user without the cellular phone 10 uses the MFP 30, the view of the display part 34 of the MFP 30 becomes that of the default user. Accordingly, the user without the cellular phone 10 can also use the MFP 30 referring the default display information.

In this case, the setting information in a row of the user name "Default" of FIG. 2B is stored in the environment storage area in the RAM 33 in step S160 (FIGS. 5, 9) by the MFP 30.

Figure 14C:
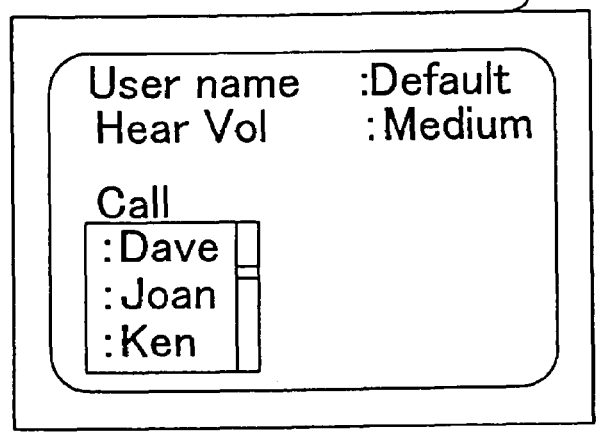

In the screen display process in step S170 (FIGS. 5, 10) as shown in FIG. 14C, the character information is displayed in the display part 34 in conditions corresponding to the setting information in a row of "Default" (font: gothic, font size: 12, display language: English) of the environment management database (FIG. 2B).

Also in the address book data display process in step S210 (FIGS. 5, 11), the information corresponding to the user name "Default" is obtained from the address book database (Default book) and transmission record database (Default DB) to display the information in the display part 34. This information is displayed as in a portion indicated as "Call" in FIG. 14C.

In the present embodiment, even if the user carrying the cellular phone 10 having an BD address not stored in the device management database approaches the MFP 30, the view of the display part 34 is set to be easy to use for the user without a predetermined input from the operation part 35 by the user, in specific cases.

Particularly, if the property information of the user such as nationality, age, etc. are stored in the RAM 13 of the cellular phone 10, the setting information regarding display language, font and font size corresponding to the property information is set in the RAM 33 in the setting information acquisition process in step S150 (FIGS. 5, 8).

In subsequent step S160 (FIGS. 5, 9) by the MFP 30, the setting information is stored in the environment storage area in the RAM 33.

In the screen display process in step S170 (FIGS. 5, 10), the character information is displayed in the display part 34 in conditions corresponding to the setting information.

Accordingly, only if the user property information is stored in the RAM 13 of the cellular phone 10, the view of the display part 30 of the MFP 30 is switched to a view corresponding to the user nationally, age, etc. as the user just approaches the MFP 30 with the cellular phone 10.

In the present embodiment, the MFP 30 specifies the user name based on the BD address obtained from the cellular phone 10. However, the MFP 30 may specify the user name based on the device name obtained from the cellular phone 10.

Also, the device management database, environment management database, transmission record database and address book database are included in the NVRAM of the RAM 33. However, these databases may be stored in a server 50 of FIG. 1. If the server 50 stores these databases, the MFP 30 can access these databases via the LAN and Ethernet I/F 37.

In the present embodiment, the environment setting system 1 is provided with the cellular phone 10 and MFP 30. However, these apparatuses 10 and 30 can be other various apparatuses. For example, instead of the cellular phone 10, an apparatus such as a PDA, etc. may be used as a radio communication terminal, and instead of the MFP 30, apparatuses such as various office equipment, household appliance, information terminal installed in a shop, etc. may be used.

Second Embodiment

Figure 15:
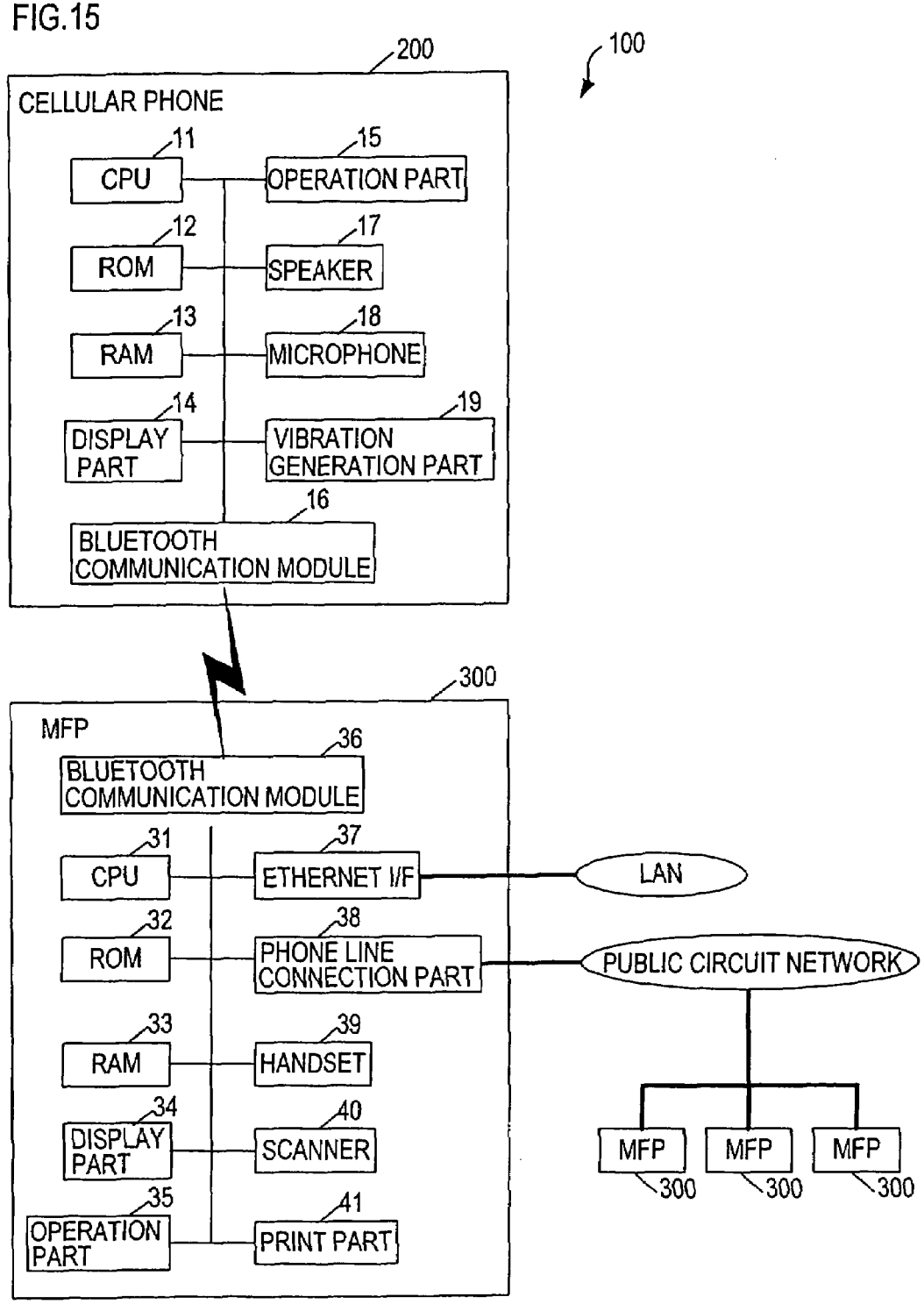
FIG. 15 is a block diagram showing a constitution of an environment setting system according to a second embodiment.

FIG. 15 is a block diagram showing a constitution of an environment setup system 100 according to a second embodiment. The environment setup system 100 is provided with a cellular phone 200 as a radio communication terminal and an MFP 300 as an electronic apparatus.

In FIG. 15, the same number is given to a component having the same hardware constitution as in the system 1 of the first embodiment, and the description of the same is not repeated, or is simplified.

The MFP 300, as in the MFP 30 in the first embodiment, comprises the CPU 31, ROM 32, RAM 33, display part 34, operation part 35, Bluetooth communication module 36, Ethernet interface (I/F) 37, phone line connection part 38, handset 39, scanner 40 and print part 41.

In the MFP 30, as in the MFP 30 of the first embodiment, the CPU 31 runs programs stored in the ROM 32 to handle various processes such as the reception process, print process, fax transmission process, fax reception process, phone process, copy process and address book management process.

Figure 16:
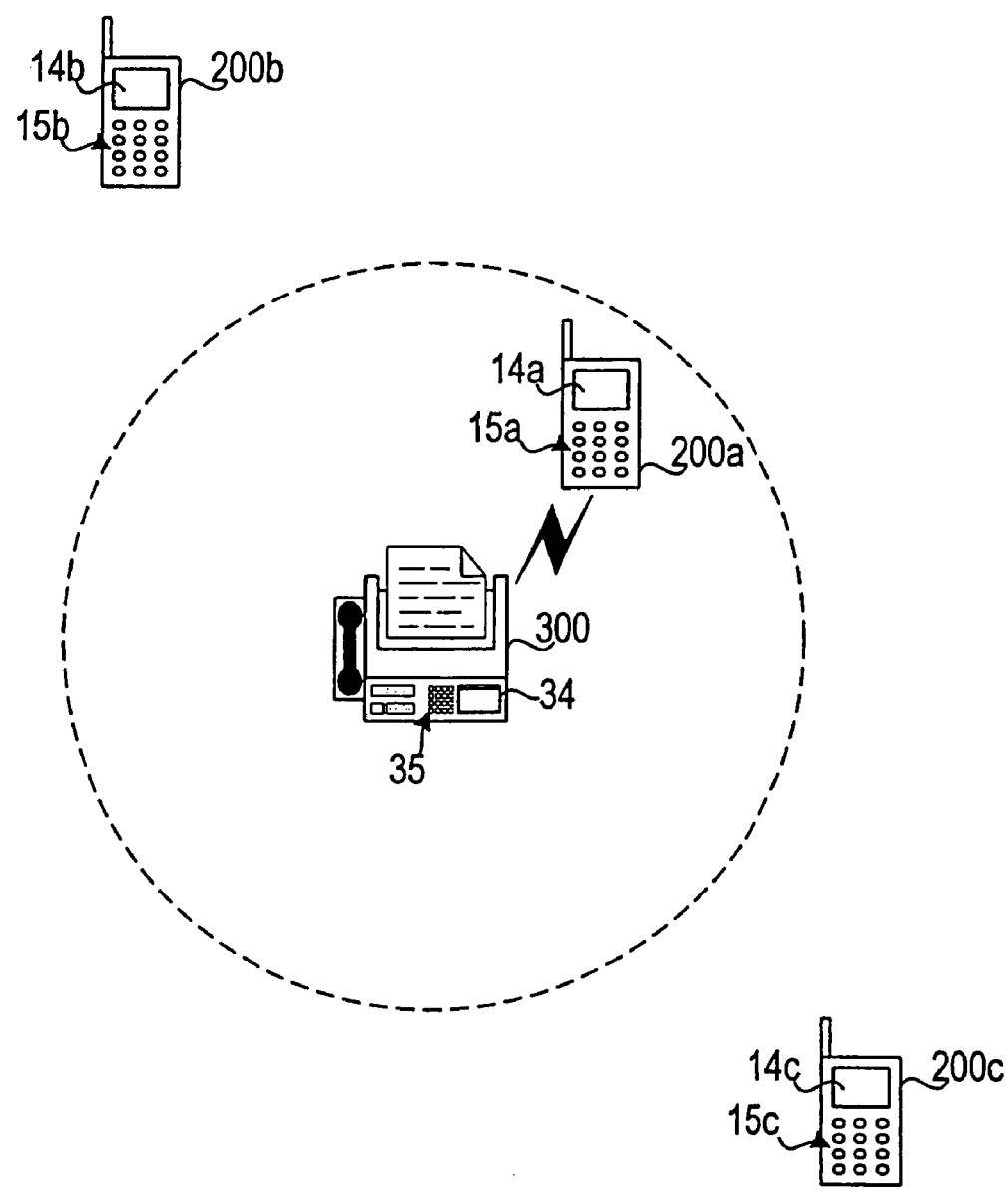
FIG. 16 is an explanatory view showing a communication range of an MFP when the Bluetooth is adopted, according to the first embodiment.

The communication range of the Bluetooth communication module 36 is, as in the first embodiment, within a radius of a few meters (5 m, for example) from the MFP 30 (range indicated with dotted lines in FIG. 16). The MFP 300 (module 36) can communicate with the cellular phone 10 within this range. In conditions shown in FIG. 16, for example, the cellular phone 200a can communicate with the MFP 300, while the cellular phones 200b, 200c cannot communicate with the MFP 300.

The cellular phone 200, as in the cellular phone 10 of the first embodiment, comprises the CPU 11, ROM 12, RAM 13, display part 14, operation part 15, speaker 17, microphone 18, vibration generation part 19 and a Bluetooth communication module 16 as shown in FIG. 1.

In the cellular phone 200, as in the cellular phone 10 of the first embodiment, the CPU 11 runs programs stored in the ROM 12 to handle various processes such as the communication process, email process, browser process and transmission process via the Bluetooth communication module 16.

The cellular phone 200 stores in the NVRAM of the RAM 13 the settings of the user interface which specify manners of displaying information in the display part 14, outputting sounds from the speaker 17, etc.

FIGS. 17A and 17B show the settings of the user interface. These settings are stored in the RAM 13 as a setting information management database. In the respective processes executed by the cellular phone 200, the CPU 11 displays information in the display part 14 and outputs sounds from the speaker 17 based on the settings of the user interface stored in the database.

For example, in the cellular phone 200a storing the settings for the aged (see FIG. 16), the settings of the user interface as shown in FIG. 17A are stored in the setting information management database 50a.

In other words, the setting information such as: user name "David", display language (charset) "English", font size "15 points", hear volume (output level of the speaker 17) "15", speak volume (sensitivity level of the microphone 18) "15" is stored in the setting information management database 50a. In the above setting information, the value "15" regarding hear volume and speak volume is relatively high when considered that the maximum value is "20".

In the cellular phone 200a, the respective processes in the aforementioned cellular phone are executed according to the settings in the setting information management database 50a.

Figure 18A:
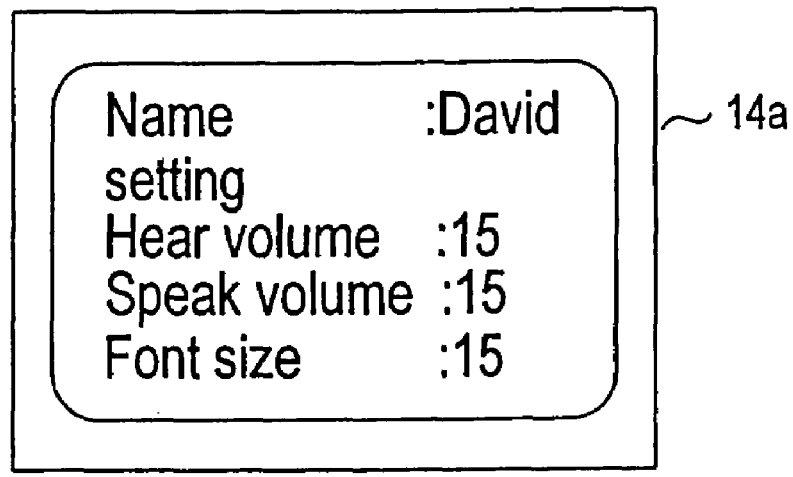
FIGS. 18A and 18B are explanatory views respectively showing a sample view of a display part of a cellular phone based on the setting information stored in the cellular phone.

For example, in the setting information display process for displaying the settings, the information is displayed in the display part 14a with 15-point English, as shown in FIG. 18A.

In the setting information management database 50a, the settings of the user interface specific to the external apparatus such as the MFP 300, etc. which is a transmission target of the cellular phone 200a is also stored.

Particularly, for example, the setting information management database 50a stores the settings used when the MFP 300 functions as a printer (paper size (Media size) upon printing "a4", number of pages to be printed in a paper (NumberUp) "4 in 1", print quality "normal") and when the MFP 300 functions as a scanner (scan type "True Gray", resolution "200× 200", image format "jpg"), as shown in FIG. 17A.

These settings specific to the MFP 300 are used in setting up the user interface of the MFP 300 when they are transmitted to the MFP 300, as described later.

In the cellular phone 200b storing settings for the young (see FIG. 16), for example, the settings of the user interface as shown in FIG. 17B are stored in the setting information management database 50b.

In other words, the setting information such as: user name "Jackson", display language (charset) "English", font size "10 points", hear volume and speak volume "10" is stored in the setting information management database 50b. The value "10" regarding hear volume and speak volume is a normal value when considered that the maximum value is "20".

Figure 18B:
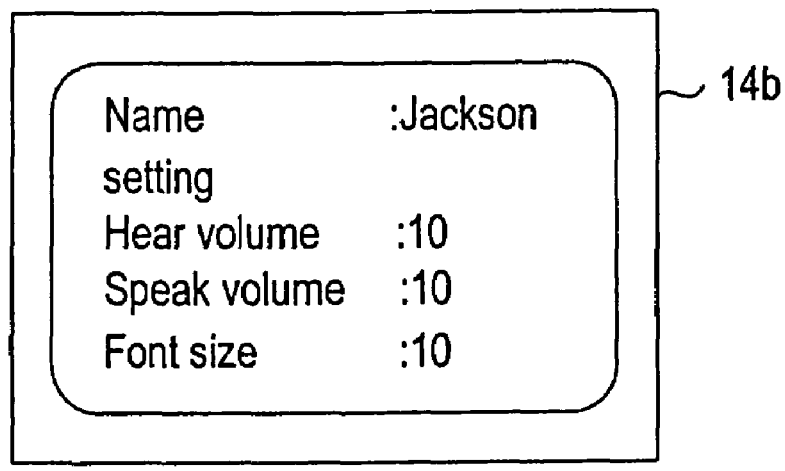

For example, in the setting information display process for displaying the settings of the user interface of the cellular phone 200b, the information is displayed in the display part 14b with 10-point English, as shown in FIG. 18B.

The setting information management database 50*b* also stores the settings of the user interface specific to the external apparatus such as the MFP 300.

Particularly, for example, the setting information management database 50*b* stores the setting information used when the MFP 300 functions as a printer (paper size (Media size) upon printing "letter", a number of pages to be printed in a paper (NumberUp) "2 in 1", print quality "high") and when the MFP 300 functions as a scanner (scan type "24bit color", resolution "300×300", image format "bmp"), as shown in FIG. 17B.

These settings specific to the MFP 300 are used in setting up the user interface of the MFP 300 when they are transmitted to the MFP 300, as described later.

The ROM 12 of the cellular phone 200 (200*a*, 200*b*), for example, stores a program for transmitting data generated in the process by the CPU 11 such as the data inputted from the operation part 15 (15*a*-15*c*), under the control of the Bluetooth communication module 16. This program is executed by the CPU 11 and data exchange with other apparatuses based on the Bluetooth standard is conducted.

The cellular phone 200 performs a user interface setting information transfer process for transferring the settings of the user interface stored in the setting information management database 50 (for example, 50*a*, 50*b* in FIGS. 17A, 17B) of the cellular phone 200 to the external apparatus via the Bluetooth communication module 16.

The MFP 300 obtains the settings of the user interface transmitted from the cellular phone 200 via the Bluetooth communication module 36, and performs a user interface setting process which switches the settings of the user interface to the obtained settings of the user interface. The above processes are explained referring to FIGS. 19-24B.

Figure 19:
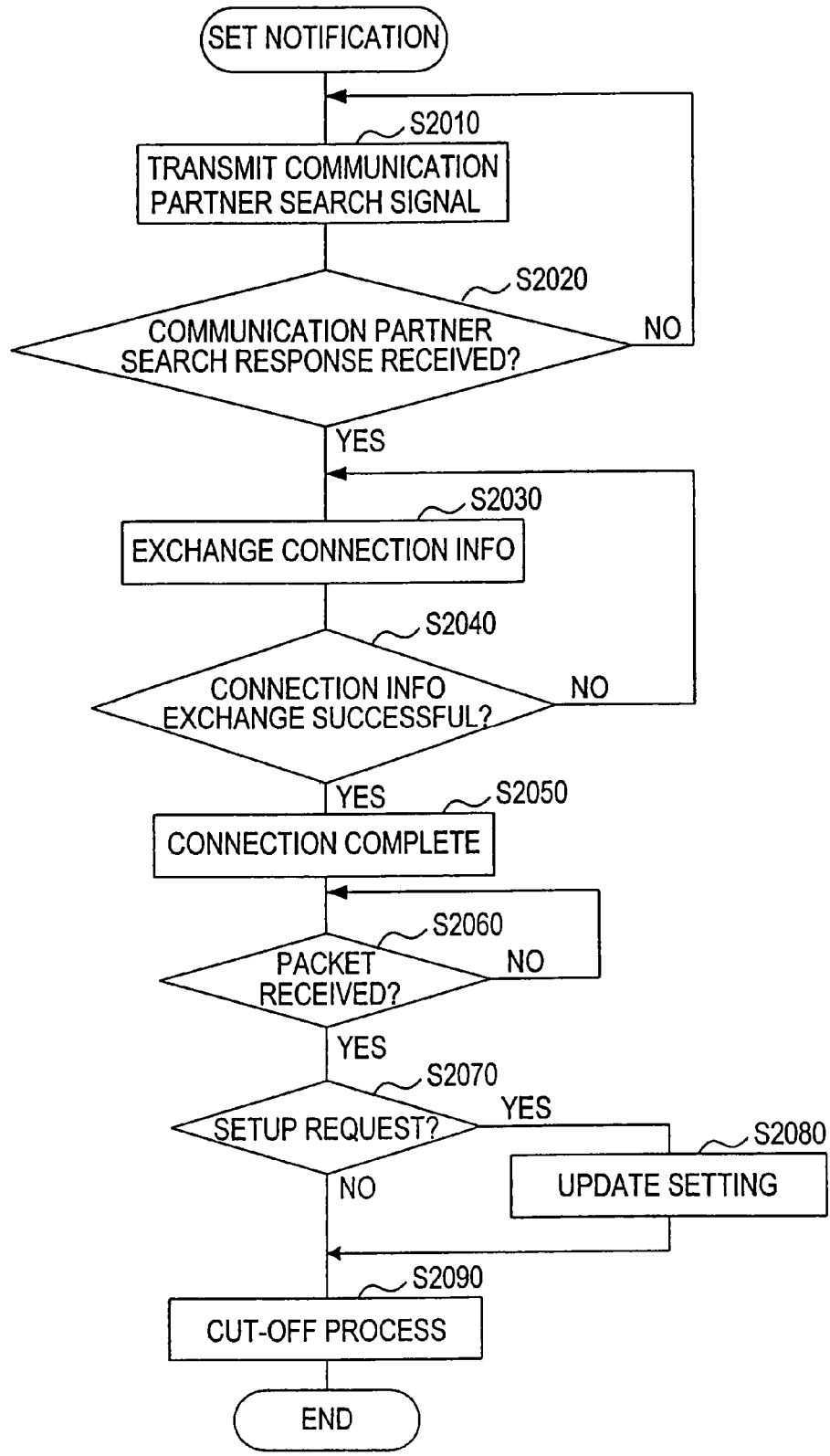
FIG. 19 is a flowchart showing a flow of a user interface setting process in the MFP according to the second embodiment.
Figure 20:
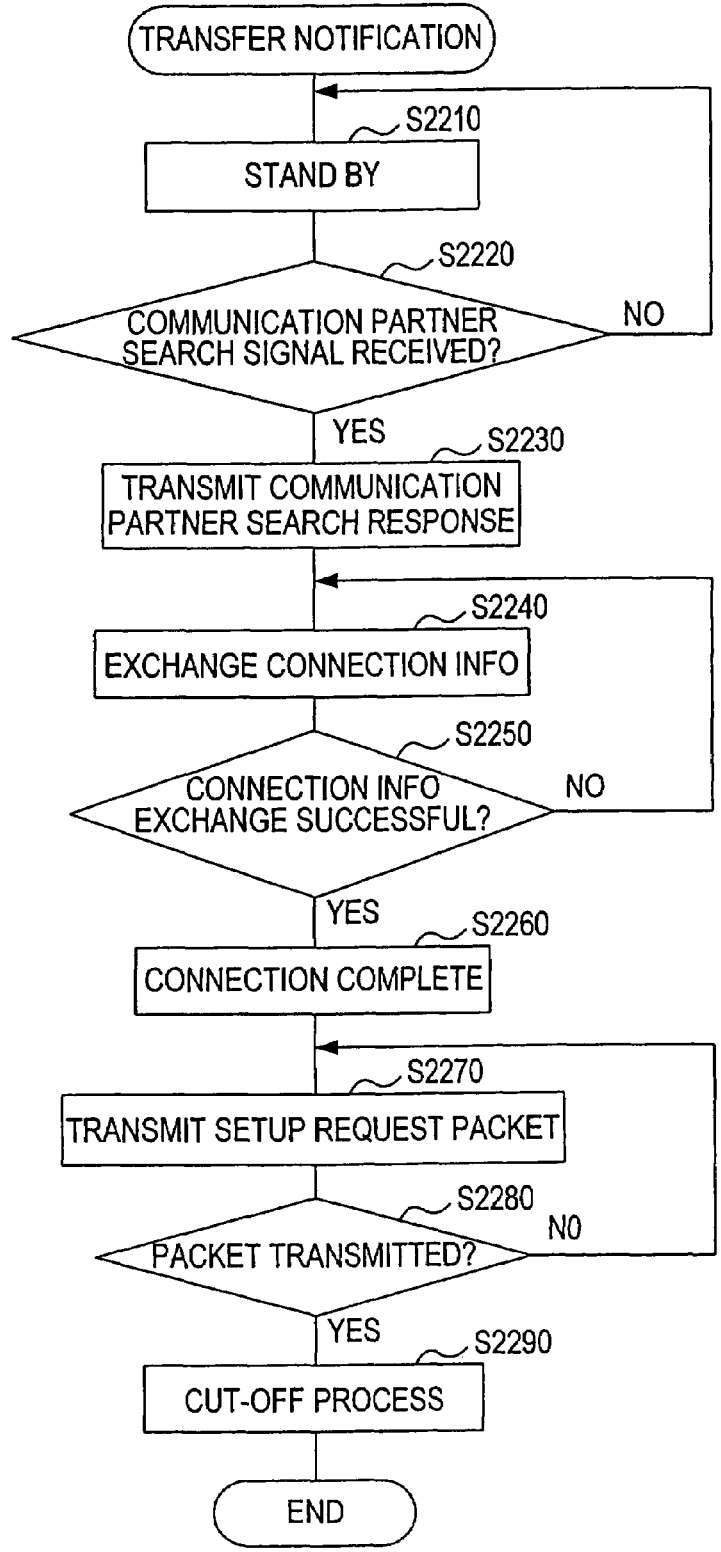
FIG. 20 is a flowchart showing a flow of a transfer process of the setting information in a cellular phone according to the second embodiment.
Figure 21:
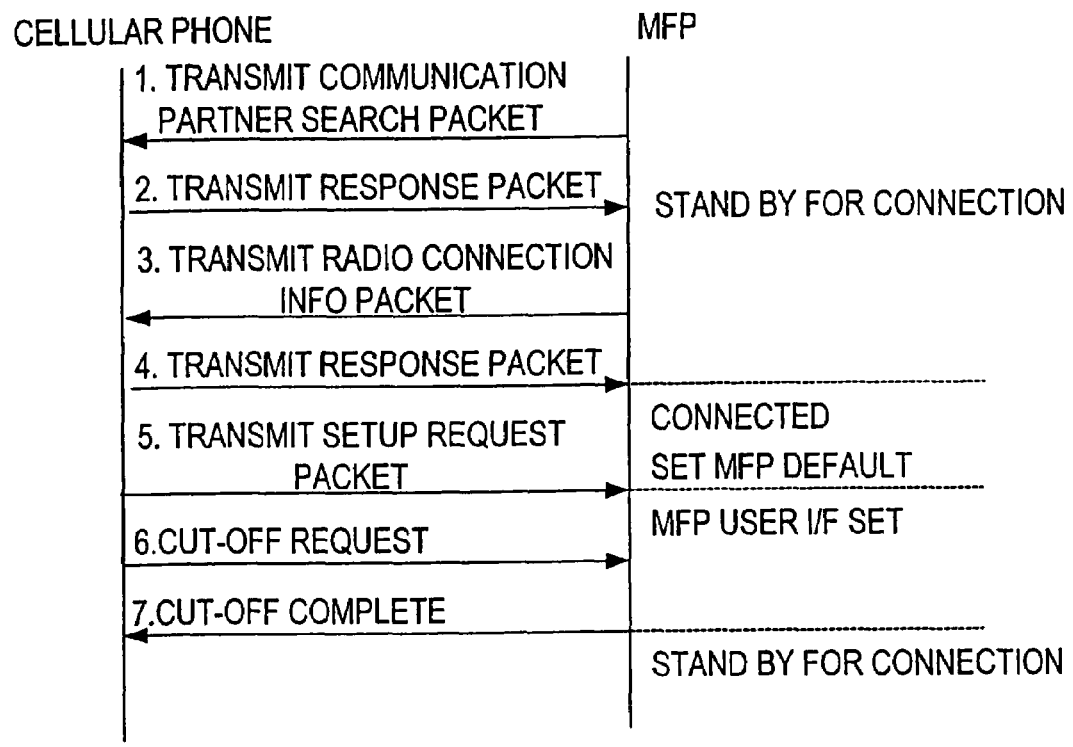
FIG. 21 is an explanatory view showing a communication sample based on Bluetooth between the MFP and cellular phone according to the second embodiment.

FIG. 19 is a flowchart showing a flow of the user interface setting process in the MFP 300, and FIG. 20 is a flowchart showing a flow of the user interface setting information transfer process in the cellular phone 200. FIG. 21 is a diagram showing a state of communication between the MFP 300 and the cellular phone 100 based on the Bluetooth and conditions of the MFP 300 in the above processes.

As shown in FIG. 19, the CPU 31 of the MFP 300 transmits a communication partner search signal (inquiry) from the Bluetooth communication module 36 in step S2010. This process corresponds to step "1. transmit communication partner search packet" of FIG. 21.

In step S2020, the CPU 31 determines whether the Bluetooth communication module 36 has received the communication partner search response. When the module 36 has not received the response (S2020: NO), the process returns to step S2010, and again the communication partner search signal is transmitted.

On the other hand, the CPU 11 of the cellular phone 200, as shown in FIG. 20, determines whether the Bluetooth communication module 16 has received the communication partner search signal (inquiry) (S2220) after standing by (S2210). When the module 16 has received the communication partner search signal (S2220: YES), the process moves to step S2230, and the communication partner search response is transmitted. The process in step S2230 corresponds to step "2. transmit response packet" of FIG. 21. Then, the process moves to step S2240. If the module 16 has not received the communication partner search signal (S2220: NO), the process returns to step S2210.

In the MFP 300, when the Bluetooth communication module 36 receives the communication partner search response (S2020 of FIG. 19: YES), the process moves to step S2030. In step 2030, connection information is exchanged between the MFP 300 and the cellular phone 200. This process corresponds to steps "3. transmit radio connection information packet" and "4. transmit response packet" of FIG. 21.

In subsequent step S2040, it is determined whether the exchange in step S2030 is successful. If it is determined successful (S2040: YES), the process moves to step S2050, and if it is determined unsuccessful (S2040: NO), the process returns to step S2030. In step S2050, a connection completion process is performed.

In the cellular phone 200, as shown in FIG. 20, exchange of the connection information is performed in step S2240. This process, as in the aforementioned step S2030, corresponds to steps "3." and "4." of FIG. 21.

In subsequent step S2250, it is determined whether the exchange of the connection information in step S2240 is successful. If it is determined successful (S2250: YES), the process moves to step S2260, and if it is determined unsuccessful (S2250: NO), the process returns to step S2240. In step S2260, the connection completion process is performed.

In step S2270, the cellular phone 200 performs a process for transmitting a setup request packet including information indicating a user interface setup request and a set of the setting items and particulars stored in the setting information management database 50 (50*a* or 50*b*) shown in FIG. 17A or 17B. This process corresponds to step "5. transmit setup request packet" of FIG. 21.

In subsequent step S2280, it is determined whether the packet transmission in step S2270 is successful. If it is determined successful (S2280: YES), the process moves to step S2290, and if it is determined unsuccessful (S2280: NO), the process returns to step S2270.

In the MFP 300, the Bluetooth communication module 36 stands by till it receives a packet transmitted from the cellular phone 200 (S2060 of FIG. 19).

If it is determined in step S2060 that the packet is received (S2060: YES), the process moves to step S2070. In step S2070, it is determined whether the packet received in step S2060 is the packet including the user interface setup request. If the packet received in step S2060 includes such a setup request (S2070: YES), the process moves to step S2080. On the other hand, if the packet received in step S2060 does not include such a setup request (S2070: NO), the process moves to step S2090.

In step S2080, the settings of the user interface of the MFP 300 are changed to the settings corresponding to the information included in the setup request packet received in step S2060.

As a result, in the process hereafter, notification is made in the display part 34 in conditions according to the settings of the user interface received from the cellular phone 200.

FIGS. 22A-24B are diagrams showing examples of the notification in the display part 34 made based on the settings received from the cellular phone 200.

Figure 24A:
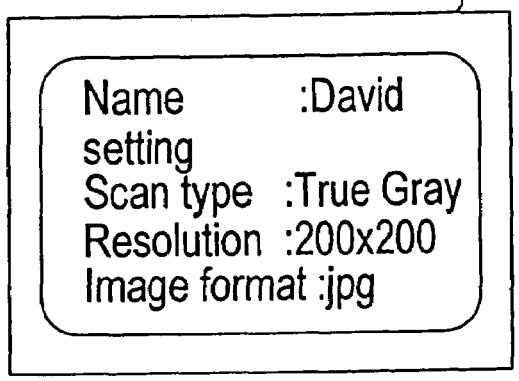
Figure 24B:
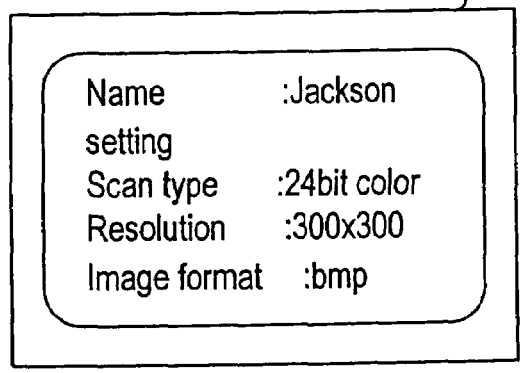

FIGS. 22A and 22B are diagrams showing views of the display part 34 when a process for displaying the setting information to be used when the MFP 30 serves as a phone or fax machine in the display part 34. FIGS. 23A and 23B are diagrams showing views of the display part 34 when a process for displaying the setting information to be used when the MFP 30 serves as a printer in the display part 34. FIGS. 24A and 24B are diagrams showing views of the display part 34 when a process for displaying the setting information to be used when the MFP 30 performs a process as a scanner in the display part 34.

For example, when the MFP 30 receives the packet including the setting items and particulars indicated in FIG. 17A from the cellular phone 200*a* carried by "David", the view according to the received settings is shown in the display part 34 as in FIGS. 22A, 23A and 24A.

If the MFP 30 receives the packet including the setting items and particulars indicated in FIG. 17B from the cellular phone 200*b* carried by "Jackson", for example, the view according to the received settings is shown in the display part 34 as in FIGS. 22B, 23B and 24B.

Particularly, if the MFP 30 receives the packet from the cellular phone 200*a* carried by "David", the character information in the display part 34 is indicated with 15-point English characters (see FIGS. 22A, 23A and 24A).

If the MFP 30 receives the packet from the cellular phone 200*b* carried by "Jackson", the character information in the display part 34 is indicated with 10-point English characters (see FIGS. 22B, 23B and 24B).

In the views shown in FIGS. 22A and 22B, the setting information to be used when the MFP 300 serves as a phone or fax machine is displayed, in addition to the information regarding font size of the characters displayed in the display part 34.

If the MFP 30 receives the packet from the cellular phone 200*a* carried by "David", the information that the MFP 300 has hear volume "15" and speak volume "15" as the setting information when the MFP 300 serves as a phone or fax machine is displayed, as shown in FIG. 22A.

If the MFP 30 receives the packet from the cellular phone 200*b* carried by "Jackson", the information that the MFP 300 has hear volume "10" and speak volume "10" is displayed, as shown in FIG. 22B.

Then, in the MFP 300, the process when the MFP 300 functions as a phone or fax machine is performed based on the setting information shown in FIGS. 22A and 22B.

In the views shown in FIGS. 23A and 23B, the information regarding "Media size", "NumberUp" and "Print quality" is displayed as the setting information to be used when the MFP 300 serves as a printer.

For example, when the MFP 30 receives the packet from the cellular phone 200*a* carried by "David", the information that the MFP 30 has "Media size" of "a4", "NumberUp" of "4 in 1" and "Print quality" of "normal" is displayed, as shown in FIG. 23A.

When the MFP 30 receives the packet from the cellular phone 200*b* carried by "Jackson", the information that the MFP 30 has "Media size" of "letter", "NumberUp" of "2 in 1" and "Print quality" of "high" is displayed, as shown in FIG. 23B.

In the MFP 300, the process when the MFP 300 functions as a printer is performed based on the setting information shown in FIGS. 23A and 23B.

In the views shown in FIGS. 24A and 24B, information regarding "Scan type", "Resolution" and "Image format" is displayed as the setting information used when the MFP 300 serves as a scanner.

For example, when the MFP 30 receives the packet from the cellular phone 200*a* carried by "David", the information that the MFP 30 has "Scan type" of "True Gray", "Resolution" of "200×200" and "Image format" of "jpg" is displayed, as shown in FIG. 24A.

When the MFP 30 receives the packet from the cellular phone 200*b* carried by "Jackson", the information that the MFP 30 has "Scan type" of "24bit color", "Resolution" of "300×300" and "Image format" of "bmp" is displayed, as shown in FIG. 24B.

Then, in the MFP 300, the process when the MFP 300 functions as a scanner is performed based on the setting information shown in FIGS. 24A and 24B.

Next, in the cellular phone 200, a cut-off process for radio communication is performed in step S2290 (FIG. 20).

In this process, firstly, a cut-off request signal is transmitted from the Bluetooth communication module 16. This transmission process corresponds to step "6. cut-off request" of FIG. 21. In the cellular phone 200, the Bluetooth communication module 16 stands by till it receives a cut-off completion signal from the MFP 300. In the cellular phone 200, when the Bluetooth communication module 16 receives the cut-off completion signal, a process for ending radio communication with the MFP 300 is performed. Then, the process from step S2210 is again started.

On the other hand, in the MFP 300, the cut-off process is performed in step S2090 (FIG. 19).

That is, the MFP 300 stands by for the cut-off request signal from the cellular phone 200, and when it receives the cut-off request signal, transmits the cut-off completion signal to end this process. Then, the process from step S2010 is again started.

As in the above, the settings of the user interface stored in the cellular phone 200 which enters within the communication range of the Bluetooth communication module 36 of the MFP 30 can be the settings of the user interface of the MFP 300.

Accordingly, only by approaching the MFP 300 with their cellular phone 200, the users of the MFP 300 can change the settings of the user interface to be easy to use.

In other words, without a conventional burdensome setting process of the user interface and process for calling settings of the user interface, the users of the MFP 300 are provided with their customized user interface.

The settings of the setting information management database shown in FIGS. 17A and 17B may be static by nature in the cellular phone 200, or may be capable of being changed. If the settings can be changed, the user may make change by operation in the operation part 15.

That is, for example, the cellular phones 200*a* and 200*b* may store the settings shown in FIGS. 17A and 17B, respectively, in a static manner.

Furthermore, for example, the cellular phones 200*a* and 200*b* are cellular phones of the same type, and the settings in the respective setting information management databases may be capable of being changed. David and Jackson may be able to change the default settings in the setting information management database in their cellular phones to the settings, respectively, shown in FIGS. 17A and 17B.

In the MFP 300, when a predetermined time (1 minute, for example) has passed during which the MFP 300 does not receive the communication partner search response in step S2020 of FIG. 19, for example, a process for changing the settings of the user interface to the default settings stored in advance in the ROM 32 may be executed.

In this manner, for example, when the user without the cellular phone 200 intends to use the MFP 300, the user interface of the MFP 300 is set up based on the default settings. Accordingly, in this case, the user without the cellular phone 200 can also use the MFP 300 easily.

[Others]

In the aforementioned second embodiment, the MFP 300 stands by till it receives the setup request packet (S2060 of FIG. 19), and when it receives the setup request packet from the cellular phone 200 (S2070: YES), updates the settings of the user interface (S2080), as shown in FIGS. 19-21. However, the MFP 300 may request transmission of the setting information management database from the cellular phone 200.

Furthermore, various protocols can be used as a protocol to be used based on the aforementioned Bluetooth. For example, the information regarding the user interface settings may be exchanged by SNMP, using TCP/IP. An example of the system constituted as such is explained referring to FIGS. 25A-26.

The cellular phone 200 is provided with a function of an SNMP agent, and the MFP 300 is provided with a function of a SNMP manager. In memories of both of the cellular phone 200 and MFP 300, information regarding MIB definition of SNMP (FIG. 25A) is stored.

In the RAM 13 of the cellular phone 200, the information regarding MIB definition is stored in association with the setting information management database of FIG. 17A or 17B.

Also in the RAM 13 of the cellular phone 200, information in each row regarding MIB definition in FIG. 25A is stored in association with the content of the setting information management database in FIG. 17A or 17B, as shown in FIG. 25B or 25C, for example.

That is, the content in a "tmUserName" row in FIG. 25B or 25C is stored in association with the content of "user name" in FIG. 17A or 17B, the content in a "tmCharaSet" row is stored in association with the content of "display language (charset)", the content in a "tmFontSize" row is stored in association with the content of "font size", the content in a "tmHearVolume" row is stored in association with the content of "hear volume", and the content in a "tmSpeakVolume" is stored in association with the content of "speak volume", respectively, in the RAM 13.

Figure 26:
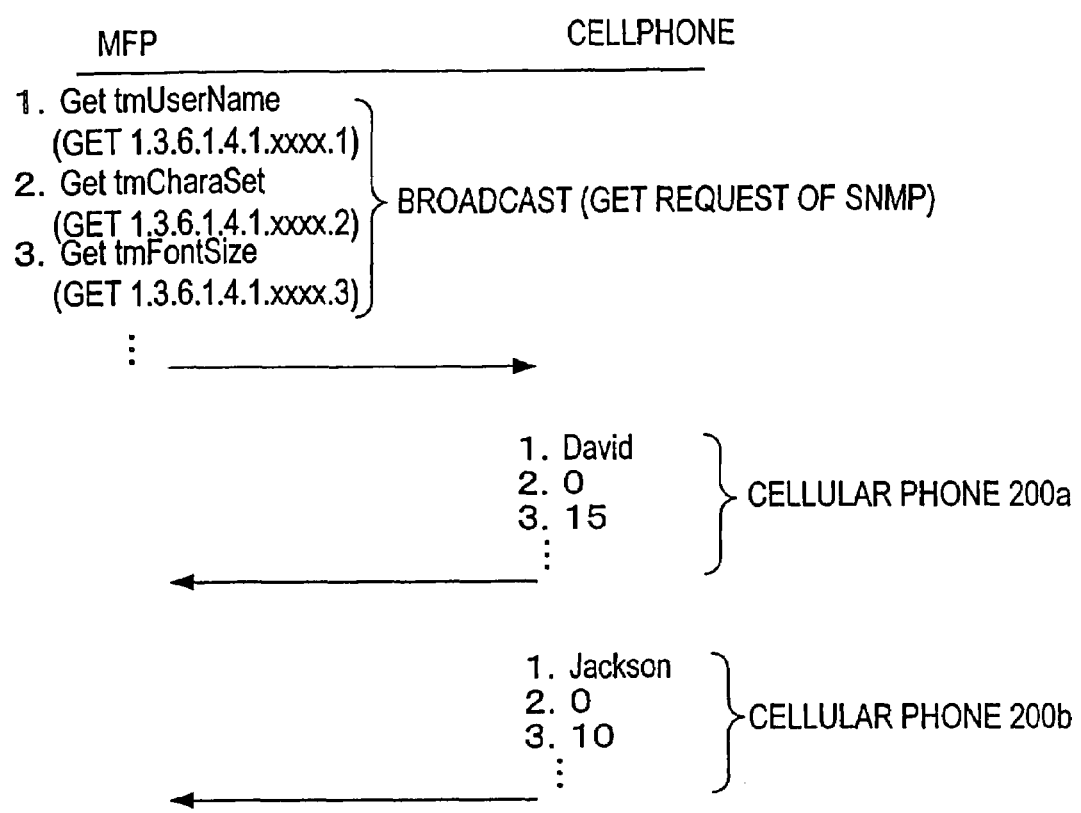
FIG. 26 is an explanatory view showing a communication sample between the MFP and cellular phone using SNMP.

The cellular phone 200 and MFP 300 execute a process shown in FIG. 26, instead of the processes in FIGS. 19-21.

As shown in FIG. 26, the CPU 31 of the MFP 300 broadcasts a GET request of SNMP from the Bluetooth communication module 36 through a process in the SNMP manager. The GET request specifies an OID (Object Identifier) corresponding to the setting item to be obtained from the cellular phone 200 as the setting of the user interface in the setting items in FIG. 25A.

When the Bluetooth communication module 16 of the cellular phone 200 receives the broadcast, the CPU 11 of the cellular phone 200 traces the aforementioned association in FIGS. 25A-25C, 17A and 17B through a process in the SNMP agent to transmit the setting corresponding to the OID requested from the SNMP manager of the MFP 300 from the Bluetooth communication module 16. For example, as shown in FIG. 26, in case of the cellular phone 200a, the setting in FIG. 25B is transmitted, and in case of the cellular phone 200b, the setting in FIG. 25C is transmitted.

When the Bluetooth communication module 36 of the MFP 300 receives the transmitted setting, the MFP 300 executes the same process as in step S2080 of the aforementioned embodiment and switches the setting of the user interface to the received setting.

The SNMP agent of the cellular phone 200, if there is no data corresponding to the OID received from the MFP 300, for example, transmits "no such" to the SNMP manager of the MFP 300. The MFP 300 which receives "no such" uses the default setting with respect to the setting item of the OID corresponding to "no such". In this manner, it is possible to maintain MIB compatibility between products and also expand MID (setting item) with ease.

In the above first and second embodiments, the communication partner search signal is transmitted from the Bluetooth communication module 36 of the MFP in order to establish communication between the MFP and the cellular phone (S110 of FIG. 5, S2010 of FIG. 19).

However, such a communication partner search signal may be transmitted from the Bluetooth communication module 16 of the cellular phone. An embodiment for this case is explained hereafter by way of FIGS. 27 and 28.

Figure 27:
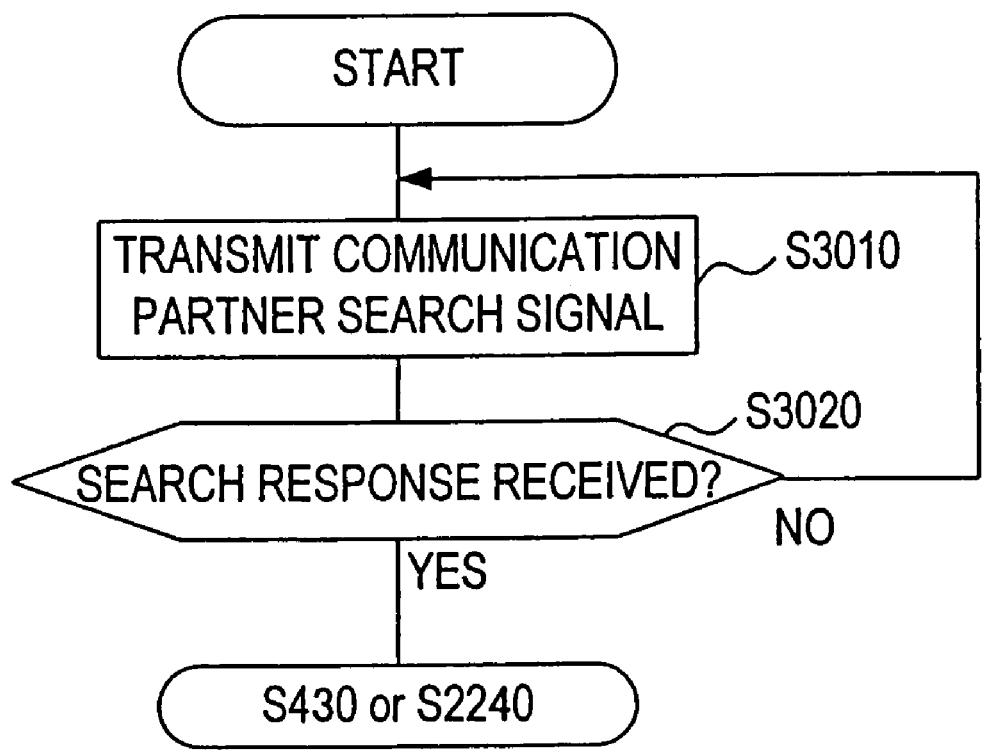
FIG. 27 is a flowchart showing a flow of alternative steps for steps S400-S420 of FIG. 6 and steps S2210-S2230 of FIG. 20.
Figure 28:
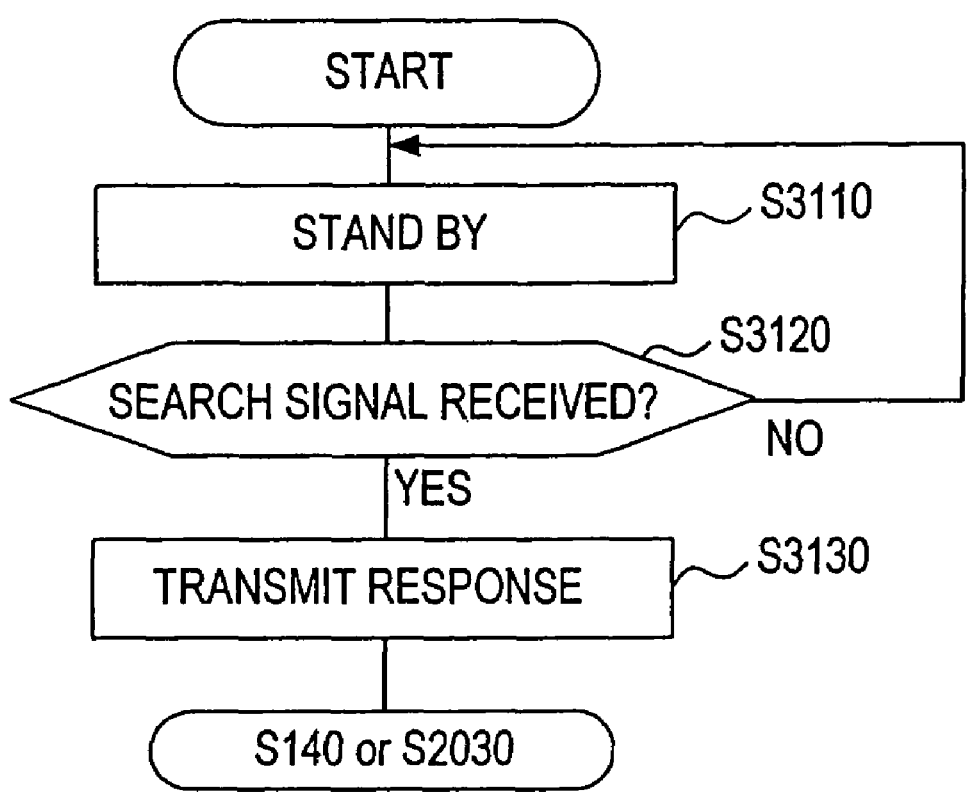
FIG. 28 is a flowchart showing a flow of alternative steps for steps S110-S130 of FIG. 5 and steps S2010-S2020 of FIG. 19.

FIG. 27 is a flowchart showing a flow of a process performed in the cellular phone 10 (200) instead of steps S400-S420 of FIG. 6 and steps S2210-S2230 of FIG. 20. FIG. 28 is a flowchart showing a flow of a process performed in the MFP 30 (300) instead of steps S110-S130 of FIG. 5 and S2010-S2020 of FIG. 19.

In case of FIG. 27, the CPU 11 of the cellular phone 10 (200) firstly transmits the communication partner search signal (inquiry) from the Bluetooth communication module 16 in step S3010.

In subsequent step S3020, the CPU 11 determines whether the Bluetooth communication module 16 has received the search response from the MFP 30 (300). If the module 16 has not received the search response (S3020: NO), the process returns to step S3010, while if the module 16 has received the search response (S3020: YES), the process moves to step S430 (FIG. 6) or step S2240 (FIG. 20).

In case of FIG. 28, the CPU 31 of the MFP 30 (300) stands by (S3110) and determines whether the Bluetooth communication module 36 has received the communication partner search signal (inquiry) (S3120). If the module 36 has received the communication partner search signal (S3120: YES), the process moves to step S3130, while if it has not received the communication partner search signal (S3120: NO), the process returns to step S3110 (stand by).

In step S3130, the communication partner search response including the BD address and device name of the MFP 30 (300) stored in the NVRAM of the RAM 33 is transmitted from the Bluetooth communication module 36, and the process moves to step S140 (FIG. 5) or S2030 (FIG. 19).

What is claimed is:

1. An environment setup system for an electronic apparatus, comprising the electronic apparatus and a radio signal transmitting object,
   the radio signal transmitting object including:
      a storage unit that stores user interface setting specification information that is used to set up a user interface of the electronic apparatus; and
      a transmission unit that transmits the user interface setting specification information stored in the storage unit to the electronic apparatus,
   the electronic apparatus including:
      the user interface;
      a reception unit that receives the user interface setting specification information transmitted from the radio signal transmitting object; and
      a setup unit that sets up the user interface of the electronic apparatus based on the user interface setting specification information received by the reception unit.

2. The environment setup system as set forth in claim 1 wherein
   the radio signal transmitting object includes a predetermined user interface, and
   the user interface setting specification information stored in the storage unit of the radio signal transmitting object includes settings of the predetermined user interface of the radio signal transmitting object.

3. The environment setup system as set forth in claim 1 wherein
   the electronic apparatus includes as the user interface of the electronic apparatus a notification unit that supplies information with respect to the electronic apparatus, the user interface setting specification information stored in the storage unit of the radio signal transmitting object includes information regarding a language setting, the setup unit of the electronic apparatus sets up the user interface corresponding to the information regarding the language setting, and the notification unit supplies information with respect to the electronic apparatus in a language set by the setup unit.

4. The environment setup system as set forth in claim 1 wherein the radio signal transmitting object includes:

an input unit that provides a command for changing the user interface setting specification information stored in the storage unit of the radio signal transmitting object; and a setting change unit that changes the user interface setting specification information stored in the storage unit of the radio signal transmitting object based on the command for changing provided by the input unit.

5. The environment setup system as set forth in claim 1 wherein the electronic apparatus includes a detection unit that detects presence of the radio signal transmitting object located within a predetermined communicable distance from the electronic apparatus, and a request unit that requests transmission of the user interface setting specification information from the radio signal transmitting object detected by the detection unit, and the transmission unit of the radio signal transmitting object transmits the user interface setting specification information when there is a request for transmission of the user interface setting specification information from the request unit.

6. The environment setup system as set forth in claim 1 wherein the electronic apparatus includes a search signal transmission unit that transmits a search signal for searching a radio signal transmitting object located within a predetermined communicable distance from the electronic apparatus, and the transmission unit of the radio signal transmitting object transmits the user interface setting specification information when it receives the search signal.

7. The environment setup system as set forth in claim 1 wherein the radio signal transmitting object includes a detection unit that detects presence of the electronic apparatus located within a predetermined communicable distance from the radio signal transmitting object, and the transmission unit transmits the user interface setting specification information to the electronic apparatus detected by the detection unit.

8. The environment setup system as set forth in claim 1 wherein the radio signal transmitting object includes a search signal transmission unit that transmits a search signal for searching the electronic apparatus located within a predetermined communicable distance from the radio signal transmitting object, the electronic apparatus includes a request unit that requests for transmission of the user interface setting specification information from the radio signal transmitting object which transmits the search signal, when the electronic apparatus receives the search signal from the search signal transmission unit, and the transmission unit of the radio signal transmitting object transmits the user interface setting specification information when there is a request for transmission of the user interface setting specification information from the request unit.

9. The environment setup system as set forth in claim 1 wherein the user interface setting specification information stored in the storage unit of the radio signal transmitting object includes address information regarding at least one of the radio signal transmitting object, a transmission destination of the radio signal transmitting object or a user of the radio signal transmitting object, and the setup unit of the electronic apparatus sets up the electronic apparatus in such a way that the address information specified by the user interface setting specification information received by the reception unit is available in the electronic apparatus.

10. An environment setup system that comprises a radio signal transmitting object and an electronic apparatus provided with a predetermined user interface and capable of communicating with the radio signal transmitting object, and that sets up the user interface of the electronic apparatus, wherein the radio signal transmitting object includes:

a storage unit that stores settings of the user interface of the electronic apparatus: and a transmission unit that transmits user interface setting specification information which specifies the settings of the user interface stored in the storage unit to the electronic apparatus, the electronic apparatus includes:

a reception unit that receives the user interface setting specification information transmitted from the radio signal transmitting object; and a setup unit that sets up the user interface of the electronic apparatus based on the user interface setting specification information received by the reception unit.

11. An electronic apparatus comprising:

a user interface, a reception unit that receives user interface setting specification information which specifies settings of the user interface of the electronic apparatus, the interface setting specification information being transmitted from a radio signal transmitting object which stores the user interface setting specification information, and a setup unit that sets up the user interface of the electronic apparatus based on the user interface setting specification information received by the reception unit.

12. The electronic apparatus as set forth in claim 11 wherein the radio signal transmitting object includes a predetermined user interface, the user interface setting specification information received by the reception unit includes information specifying settings of the predetermined user interface of the radio signal transmitting object, and the setup unit sets up the user interface of the electronic apparatus based on the information specifying the settings of the predetermined user interface of the radio signal transmitting object.

13. The electronic apparatus as set forth in claim 11 further comprising a notification unit that supplies information with respect to the electronic apparatus as the user interface, wherein the user interface setting specification information received by the reception unit includes information regarding a language setting, and the setup unit sets up the user interface according to the information regarding the language setting and the notification unit supplies the information with respect to the electronic apparatus in a language set by the setup unit.

14. The electronic apparatus as set forth in claim 11 further comprising
a detection unit that detects presence of the radio signal transmitting object located within a predetermined communicable distance from the electronic apparatus, and a request unit that requests for transmission of the user interface setting specification information from the radio signal transmitting object detected by the detection unit.

15. The electronic apparatus as set forth in claim 11 further comprising
a search signal transmission unit that transmits a search signal for searching the radio signal transmitting object located within a predetermined communicable distance from the electronic apparatus.

16. The electronic apparatus as set forth in claim 11 further comprising
a request unit that requests transmission of the user interface setting specification information from the radio signal transmitting object which transmits a search signal for searching the electronic apparatus located within a predetermined communicable distance from the radio signal transmitting object, when the electronic apparatus receives the search signal from the radio signal transmitting object.

17. The electronic apparatus as set forth in claim 11 wherein
the user interface setting specification information received by the reception unit includes address information regarding at least one of the electronic apparatus, a transmission destination of the electronic apparatus or a user of the electronic apparatus, and
the setup unit sets up the electronic apparatus in such a way that the address information specified by the user interface setting specification information received by the reception unit is available in the electronic apparatus.

18. The environment setup system as set forth in claim 1, wherein
the user interface setting specification information for a user includes at least one of a speaker volume or a display property of the user interface for the user, the display property including at least a display language, a font, or a font size of a display of the user interface.

19. The electronic apparatus as set forth in claim 11, wherein the user interface setting specification information for a user includes at least one of a speaker volume or a display property of the user interface for the user, the display property including at least a display language, a font, or a font size of a display of the user interface.

20. A computer-readable carrier having a computer-executable program embedded thereon for controlling an electronic apparatus provided with a user interface, the computer-executable program, when executed by the electronic apparatus, controlling the electronic apparatus to perform the following steps:
a reception step in which user interface setting specification information which specifies settings of the user interface transmitted from a radio signal transmitting object which stores the user interface setting specification information is received by the electronic apparatus, and
a setup step in which the user interface of the electronic apparatus is set up based on the user interface setting specification information received in the reception step.

* * * * *